United States Patent [19]
Cloonan et al.

[11] Patent Number: 5,537,403
[45] Date of Patent: Jul. 16, 1996

[54] TERABIT PER SECOND PACKET SWITCH HAVING DISTRIBUTED OUT-OF-BAND CONTROL OF CIRCUIT AND PACKET SWITCHING COMMUNICATIONS

[75] Inventors: Thomas J. Cloonan, Downers Grove; Gaylord W. Richards, Lisle, both of Ill.

[73] Assignee: AT&T Corp., Murray Hill, N.J.

[21] Appl. No.: 366,708

[22] Filed: Dec. 30, 1994

[51] Int. Cl.$^6$ .................................................. H04L 12/56
[52] U.S. Cl. .............................................. 370/60.1; 370/54
[58] Field of Search .............................. 370/60, 60.1, 61, 370/94.1, 94.2, 63, 64, 65, 65.5, 16, 58.2, 58.3, 53, 55, 56, 54; 340/827; 395/181

[56] References Cited

U.S. PATENT DOCUMENTS

| | | | |
|---|---|---|---|
| 4,035,584 | 7/1977 | Lurtz | 370/63 |
| 4,592,048 | 5/1986 | Beckner et al. | 370/60 |
| 4,817,082 | 3/1989 | Orsic | 370/58.1 |
| 4,872,158 | 10/1989 | Richards | 370/58.1 |
| 4,988,993 | 1/1991 | Hwang et al. | 340/825 |
| 4,993,016 | 2/1991 | Richards | 370/54 |
| 5,122,892 | 6/1992 | Cloonan et al. | 359/117 |
| 5,237,565 | 8/1993 | Henrion et al. | 370/60.1 |
| 5,258,978 | 11/1993 | Cloonan et al. | 370/60 |
| 5,291,482 | 3/1994 | McHarg et al. | 370/60 |
| 5,303,232 | 4/1994 | Proctor et al. | 370/60 |
| 5,311,345 | 5/1994 | Cloonan et al. | 359/139 |
| 5,345,441 | 9/1994 | Paker et al. | 370/54 |
| 5,412,646 | 5/1995 | Cyr et al. | 370/56 |

OTHER PUBLICATIONS

Y. S. Yeh et al., "The Knockout Switch: A Simple, Modular Architecture for High–Performance Packet Switching", *ISS '87 AT&T Technical Papers*, pp. 287–311.

W. E. Stephens et al. "Terabit–per–Second Throughput Switches For Broadband Central Offices: An overview", *IEEE LCS*, Nov. 1990, pp. 20–26.

K. Y. Eng et al. "A Growable Packet (ATM) Switch Architecture: Design Principles and Applications", *IEEE Transactions on Communications*, vol. 40, No. 2, Feb. 1992, pp. 423–430.

*Primary Examiner*—Douglas W. Olms
*Assistant Examiner*—Dang Ton
*Attorney, Agent, or Firm*—Jack R. Penrod

[57] ABSTRACT

A telecommunications switch which has a central switch fabric made up of multiple crossbars that can be used to switch either circuit switched or packet switch communications as long as appropriate input and output interfaces and controllers are provided. Thus, a large, high throughput telecommunications switch is provided where the expensive switch fabric core can remain the same and the interfaces and control cards changed as the relative demands for circuit switched communications and packet switched communications, such as ATM, evolve. Besides being flexible, this switch may also be fault tolerant.

11 Claims, 19 Drawing Sheets

| TIME | PIPE₀ CONTROLLER | PIPE₁ CONTROLLER | PIPE₂ CONTROLLER | PIPE₃ CONTROLLER |
|---|---|---|---|---|
| i, 0 | GROUP 1, PERIOD i | | | |
| i, 1 | | GROUP 1, PERIOD i | | |
| i, 2 | | GROUP 2, PERIOD i | GROUP 1, PERIOD i | |
| i, 3 | | | GROUP 2, PERIOD i | GROUP 1, PERIOD i |
| i, 4 | | | GROUP 3, PERIOD i | GROUP 2, PERIOD i |
| i, 5 | GROUP 2, PERIOD i+1 | | | GROUP 3, PERIOD i |
| i, 6 | GROUP 3, PERIOD i+1 | | | GROUP 4, PERIOD i |
| i, 7 | GROUP 4, PERIOD i+1 | GROUP 3, PERIOD i+1 | | |
| i, 8 | | GROUP 4, PERIOD i+1 | | |
| i, 9 | | | GROUP 4, PERIOD i+1 | |

| REQUEST IN | CURRENT BUSY/IDLE | REQUEST OUT | CONNECT | NEXT BUSY/IDLE |
|---|---|---|---|---|
| 0 | 0 | 0 | 0 | 0 |
| 0 | 1 | 0 | 0 | 1 |
| 1 | 0 | 0 | 1 | 1 |
| 1 | 1 | 1 | 0 | 1 |

FIG. 14

| TIME | CONTROLLER 24₀ | CONTROLLER 24₁ | CONTROLLER 24₂ | CONTROLLER 24₃ |
|---|---|---|---|---|
| i-1,17 | $R_{N,i-1} \times B_{0,i}$ | $R_{M,i-1} \times B_{1,i}$ | * 2 | $R_{O,i-1} \times B_{3,i-1}$ |
| i-1,18 | $R_{O,i-1} \times B_{0,i}$ | $R_{N,i-1} \times B_{1,i}$ | $R_{M,i-1} \times B_{2,i}$ | $R_{P,i-1} \times B_{3,i-1}$ |
| i-1,19 | $R_{P,i-1} \times B_{0,i}$ | $R_{O,i-1} \times B_{1,i}$ | $R_{N,i-1} \times B_{2,i}$ | |
| i,0 | $R_{A,i} \times B_{0,i}$ | $R_{P,i-1} \times B_{1,i}$ | $R_{O,i-1} \times B_{2,i}$ | |
| i,1 | $R_{B,i} \times B_{0,i}$ | $R_{A,i} \times B_{1,i}$ | $R_{P,i-1} \times B_{2,i}$ | |
| i,2 | $R_{C,i} \times B_{0,i}$ | $R_{B,i} \times B_{1,i}$ | $R_{A,i} \times B_{2,i}$ | * 3 |
| i,3 | $R_{D,i} \times B_{0,i}$ | $R_{C,i} \times B_{1,i}$ | $R_{B,i} \times B_{2,i}$ | $R_{A,i} \times B_{3,i}$ |
| i,4 | | $R_{D,i} \times B_{1,i}$ | $R_{C,i} \times B_{2,i}$ | $R_{B,i} \times B_{3,i}$ |
| i,5 | | $R_{E,i} \times B_{1,i}$ | $R_{D,i} \times B_{2,i}$ | $R_{C,i} \times B_{3,i}$ |
| i,6 | | $R_{F,i} \times B_{1,i}$ | $R_{E,i} \times B_{2,i}$ | $R_{D,i} \times B_{3,i}$ |
| i,7 | * 0 | $R_{G,i} \times B_{1,i}$ | $R_{F,i} \times B_{2,i}$ | $R_{E,i} \times B_{3,i}$ |
| i,8 | $R_{E,i} \times B_{0,i+1}$ | $R_{H,i} \times B_{1,i}$ | $R_{G,i} \times B_{2,i}$ | $R_{F,i} \times B_{3,i}$ |
| i,9 | $R_{F,i} \times B_{0,i+1}$ | | $R_{H,i} \times B_{2,i}$ | $R_{G,i} \times B_{3,i}$ |
| i,10 | $R_{G,i} \times B_{0,i+1}$ | | $R_{I,i} \times B_{2,i}$ | $R_{H,i} \times B_{3,i}$ |
| i,11 | $R_{H,i} \times B_{0,i+1}$ | | $R_{J,i} \times B_{2,i}$ | $R_{I,i} \times B_{3,i}$ |
| i,12 | $R_{I,i} \times B_{0,i+1}$ | * 1 | $R_{K,i} \times B_{2,i}$ | $R_{J,i} \times B_{3,i}$ |
| i,13 | $R_{J,i} \times B_{0,i+1}$ | $R_{I,i} \times B_{1,i+1}$ | $R_{L,i} \times B_{2,i}$ | $R_{K,i} \times B_{3,i}$ |
| i,14 | $R_{K,i} \times B_{0,i+1}$ | $R_{J,i} \times B_{1,i+1}$ | | $R_{L,i} \times B_{3,i}$ |
| i,15 | $R_{L,i} \times B_{0,i+1}$ | $R_{K,i} \times B_{1,i+1}$ | | $R_{M,i} \times B_{3,i}$ |
| i,16 | $R_{M,i} \times B_{0,i+1}$ | $R_{L,i} \times B_{1,i+1}$ | | $R_{N,i} \times B_{3,i}$ |
| i,17 | $R_{N,i} \times B_{0,i+1}$ | $R_{M,i} \times B_{1,i+1}$ | * 2 | $R_{O,i} \times B_{3,i}$ |
| i,18 | $R_{O,i} \times B_{0,i+1}$ | $R_{N,i} \times B_{1,i+1}$ | $R_{M,i} \times B_{2,i+1}$ | $R_{P,i} \times B_{3,i}$ |
| i,19 | $R_{P,i} \times B_{0,i+1}$ | $R_{O,i} \times B_{1,i+1}$ | $R_{N,i} \times B_{2,i+1}$ | |
| i+1,0 | $R_{A,i+1} \times B_{0,i+1}$ | $R_{P,i} \times B_{1,i+1}$ | $R_{O,i} \times B_{2,i+1}$ | |
| i+1,1 | $R_{B,i+1} \times B_{0,i+1}$ | $R_{A,i+1} \times B_{1,i+1}$ | $R_{P,i} \times B_{2,i+1}$ | |
| i+1,2 | $R_{C,i+1} \times B_{0,i+1}$ | $R_{B,i+1} \times B_{1,i+1}$ | $R_{A,i+1} \times B_{2,i+1}$ | * 3 |
| i+1,3 | $R_{D,i+1} \times B_{0,i+1}$ | $R_{C,i+1} \times B_{1,i+1}$ | $R_{B,i+1} \times B_{2,i+1}$ | $R_{A,i+1} \times B_{3,i+1}$ |
| i+1,4 | | $R_{D,i+1} \times B_{1,i+1}$ | $R_{C,i+1} \times B_{2,i+1}$ | $R_{B,i+1} \times B_{3,i+1}$ |

TERABIT PER SECOND PACKET SWITCH HAVING DISTRIBUTED OUT-OF-BAND CONTROL OF CIRCUIT AND PACKET SWITCHING COMMUNICATIONS

CROSS REFERENCES

This application is related to the following co-pending applications: "TERABIT PER SECOND PACKET SWITCH" by Thomas Cloonan and Gaylord Richards, Ser. No. 08/366,708; "TERABIT PER SECOND ATM PACKET SWITCH HAVING DISTRIBUTED OUT-OF-BAND CONTROL" by Thomas Cloonan and Gaylord Richards, Ser. No. 08/367,489; "METHOD AND APPARATUS FOR DETECTING AND PREVENTING THE COMMUNICATION OF BIT ERRORS ON A HIGH PERFORMANCE SERIAL DATA LINK" by Thomas Cloonan, Ser. No. 08/366,706; and "TERABIT PER SECOND DISTRIBUTION NETWORK" Thomas Cloonan and Gaylord Richards, Ser. No. 08/366,707; and "APPARATUS AND METHOD FOR REDUCING DATA LOSSES IN A GROWABLE PACKET SWITCH" by Thomas Cloonan and Gaylord Richards Ser. No. 08/366,705.

TECHNICAL FIELD

The invention relates to large telecommunication switches and more particularly to large telecommunication switches that use data packets in order to communicate at aggregate throughputs at the one terabit per second level.

DESCRIPTION OF THE PRIOR ART

Telecommunications have long used digital switching to encode, multiplex, transmit and decode audio frequencies in order to carry the millions of telephone voice calls of the world. Telecommunication switches for voice calls have grown to very large sizes to keep pace with the demand. Most of the switching systems that route and control voice call traffic are called circuit switches, which means that for each call a type of bi-directional audio circuit is set up between the calling party and the called party. The circuit that is set up has the bandwidth and transport timing necessary to simulate a face-to-face conversation without objectionable distortion or time delays.

An alternative to circuit switching is called packet switching. For packet switching, the calling party is responsible for converting the information into one or more packets. This information could be encoded voice, it could be encoded computer data, or it could be encoded video. The number of the called party is typically included in a packet header to guide the packet to its destination. The packet switching network has the task of routing each packet to its respective destination without undue delay. The called party usually has the equipment to receive the packets and decode the information back into an appropriate form.

The extremely rapid growth of packet switching traffic carrying voice, computer (LAN/WAN), facsimile, image and video data to an ever widening variety of locations, along with the proposals for a National Information Infrastructure, has challenged both the packet switch protocols and system architecture's.

Many vendors and service providers have joined forces to define a global standard that would permit packet switching services to be provided in a ubiquitous fashion. The result of this coordinated effort has been the rapid development and deployment of an Asynchronous Transfer Mode (ATM) as a means of efficiently routing and transporting data packets that have stochastically-distributed arrival rates according to the recent ATM standard. ATM is thus a packet-oriented standard, but unlike most of its data packet predecessors (X.25, frame relay, etc.), ATM uses short, fixed-length, 53-byte packets that are called cells. ATM also uses a very streamlined form of error recovery and flow control relative to its predecessors. In fact, the ATM standard essentially eliminates most error protection and flow control at the link level, leaving these functions to higher level protocols at the edges of the network. This approach permits rapid routing of the short cells with minimal network delay and jitter, making ATM compatible with voice, data and video services. ATM has been embraced by the computer, LAN, and WAN industries, so a seam-less packet communication from the source computer through LANs, WANs, and the public-switched network is a reality.

If this level of connectivity becomes available to the average consumer and if advanced broadband services that combine voice, broadband data and video are similarly available at a reasonable price, then the volume of ATM traffic that may be generated in the future is virtually limitless. As a result, the number and size of the switches and cross-connects required to route this ATM packet traffic may also grow by phenomenal rates within the next decade. ATM switches and cross-connects for toll and gateway applications may require aggregate bandwidths ranging from 155 gigabits per second (1000 inputs at SONET OC-3 155 megabits per second rates) to 2.4 terabits per second (1000 inputs at SONET OC-48 2.4 gigabits per second rates). Additionally, if demand for broadband services to the home and/or LAN/WAN connectivity through the public-switched network grows as some experts believe, then local telephone exchange carriers may require ATM switches and cross-connects for metropolitan area network (MAN) applications having aggregate bandwidths ranging from 100 gigabits per second (50,000 inputs at Ethernet 10 megabits per second rates and 20 percent occupancy) to 775 gigabits per second (50,000 inputs at SONET OC-3 155 megabits per second rates and 10 percent occupancy).

By necessity, most of the current architectural research and hardware/software development for ATM switches has concentrated on switches with much smaller aggregate bandwidths that will meet the more near-term needs of the marketplace. For example, most of the proposals within the LAN/WAN community have supported aggregate bandwidths ranging from 150 megabits per second to 12 gigabits per second, and most of the published proposals within the telecommunications community have supported aggregate bandwidths ranging from 20 gigabits per second to 160 gigabits per second. Extensions of most of these architecture's to larger sizes usually produce systems that are cost prohibitive, size prohibitive, and/or physically unrealizable because of limits of the underlying to technology.

For example, very common designs for large, high-throughput switches use a multi-stage interconnection network containing multiple stages of switching nodes (node-stages) interconnected by stages of links (link-stages) to provide multiple paths between input ports and output ports. Clos, Banyan and Benes networks are examples of such networks. A multiple stage network design can yield networks with very high levels of performance (low blocking probabilities, low delay, high degrees of fault tolerance, etc.), and may result in low system-level costs, because network resources (nodes and links) are time-shared by the many different paths that can be set up within the network. Physically realizing a multistage network for ATM is, however, a problem.

The design of any large, high-throughput ATM switching architecture must address two fundamental issues that profoundly effect the overall performance of the resulting ATM switch. The first of these issues is cell loss due to blocking within the internal links of the distribution network (also known as the switching fabric), and the second is cell loss due to contention for output ports by two or more ATM cells that pass through the switch at the same moment in time. The first issue can usually be solved by designing a network with sufficient switching fabric (nodes and links) so that multiple paths exist between input ports and output ports. As a result, if two or more ATM cells attempt to use the same shared resource (nodes or links) within the switching fabric, the cells can usually find two disjoint paths that eliminate the internal network blocking problem. The second issue requires the switch designer to identify a technique for handling simultaneous cells.

A general design technique for a switch to handle cells destined for the same output port is analyzed in an article, A Growable Packet Switch Architecture, IEEE Transactions on Communications, February, 1992, by Eng et al. and in another article The Knockout Switch, ISS AT&T Technical Papers, 1987, by Yeh et al. This general design technique segments the switch into two distinct parts, as shown in FIG. 1. A N×(FN) distribution network (which provides for N input ports) and a bank of K m×n output packet modules (which provide for a total of M=Kn output ports). Given that each of the links emanating from the distribution network is required to be terminated at one of the inputs to an output packet module, it can be seen that the equation FN=Km must be satisfied. The switching fabric is a memory-less N×(FN) fanout switch whose function is to route an arriving ATM cell to any of the m inputs on the output packet module connected to the cell's desired output port. The output packet module is a m×n switch with buffers that are available for storing cells that must be delayed when two or more cells contend for a particular output port. If the arriving traffic is uniformly distributed across all output ports and if the buffers within the output packet modules are sufficiently large, then the ratio m:n can always be chosen large enough to force the cell loss probability within the network to be below any desired cell loss probability level. In fact, if the network size (N) is large and if R represents the switch loading, then the cell loss probability of a network with m×n output packet modules as shown by Eng et al is given by:

$$P(\text{cell loss}) = [1 - m/(nR)]\left[1 - \sum_{k=0}^{m}\{(nR)^k e^{(-nR)}\}/k!\right] + (nR)^m e^{(-nR)}/m!.$$

Present packet switches have acceptable cell loss probabilities of approximately $10^{-12}$, so any loss probability smaller than present units are considered acceptable.

Besides the ATM cell losses because of internal contentions, in an ATM Packet Switch where all of the N cells arrive simultaneously at the inputs of the distribution network, the cells must be processed by each stage of the path hunt processing pipeline before the next group of N cells arrives at the network input ports. If, for example, the incoming transmission lines support SONET OC-48 2.5 gigabits per second bit-rates, then the group of N ATM cells that arrive together must be processed and sent on to the next stage of the pipeline every 176 nano second (the duration of an ATM cell on a 2.5 gigabits per second). For large values of N, a substantial amount of processing power will therefore be required to complete the path hunt operations for all N cells. (Note: If N=256, then $1.45\times10^9$ path hunts must be completed every second, which corresponds to an average processing rate of one path hunt every 684 pico seconds). Present commercial microprocessors can process approximately 100 million instructions per second. If each path hunt took only one instruction, at least 15 of microprocessors would spend 100% of their processing time performing these path hunts. Thus, a controller based on something other than a single microprocessor will be necessary for a large ATM packet switch.

Two approaches to solving the path hunt problem can be envisioned. One approach uses in-band, i.e. self-routing, control techniques to perform the path hunts. For in-band control techniques, the connection requests are prepended to the ATM cells and routed through the switch along the same paths used by the following ATM payload. This approach typically requires parallel processing elements to be distributed throughout all of the nodes in the network, resulting in relatively complicated hardware within each node of the network in order to perform localized path hunt calculations (on only the cells that pass through that node) when determining how to route the arriving connection requests and ATM cells. The second approach uses out-of-band control techniques whereby the controller and switch fabric are logically separated, so connection requests must be routed to the controller before the control signals resulting from the path hunt are injected into the switch fabric to set the paths. This second approach requires that the out-of-band controller have tremendous processing power, (as mentioned above), because of the many path hunt operations that must be performed in a very short period of time.

Since the path hunting operations in switches using in-band control techniques are only based on localized traffic information and not on global information regarding all of the switch traffic, the connections may not always be routed in optimal fashion. As a result, networks based on in-band control techniques often require more switch fabric (stages and nodes) to provide the same operating characteristics as a less expensive switch based on out-of-band control techniques. In addition, out-of-band control ATM switch architecture's share many similarities with the partitioning of many existing telecommunication switching and cross-connect products that have centralized controllers, so the development of a system based on such an architecture should yield fewer design problems than an architecture based on an entirely new architectural approach. Thus, ATM switch designers might consider an out-of-band control ATM switch to benefit from the lower overall hardware costs and more standard architectural partitioning. On the other hand, the difficulties associated with performing path hunts in an out-of-band controller for N arriving ATM cells is the time required by a standard partitioned out-of-band controller to perform N path hunts might influence ATM switch designers to consider an in-band control switch design. Assuming a single path hunt requires at least one read from a busy-idle memory and one write to a busy-idle memory, path hunt requires 2N accesses to memory. If N=256, then 512 memory accesses are required every 176 nano second, so the average memory access time must be 340 pico second. Since 340 pico second memories are not commercially available, a path hunt scheme different than the present standard architectural partitioning is required for any out-of band controller.

The high probability that large ATM switches will be required coupled with the uncertainties and shortcomings of present architecture's demonstrate a strong need in the art for a flexible packet switch architecture that will operate with throughputs at the terabit per second levels.

It is an object of the present invention to provide an ATM packet switch architecture that has a large aggregate bandwidth.

It is yet another object of the invention to provide an ATM packet switch that is flexible to meet current and future telecommunication needs as they evolve.

It is another object of the invention to provide an ATM packet switch that has a high degree of fault-tolerance.

SUMMARY OF THE INVENTION

Briefly stated, in accordance with one aspect of the invention, the foregoing objects are achieved by providing a switch architecture that has a single stage switch fabric which will operate equally well with circuit switched communications and with packet switched communications, or with a combination of both. Such a switch has the advantage of meeting present demands for circuit switched and packet switched communications and the flexibility to evolve as the demands for these services change, without major changes to the switch. Separate circuit switched and packet switched out-of-band controllers are required, as are separate input interfaces and output modules. But these are modular and can be easily modified as needs evolve. The central switch fabric does not need to change.

BRIEF DESCRIPTION OF THE DRAWING

FIG. 6 illustrates the timing sequences of requests to the controller shown in FIG. 5.

FIG. 12 is a state table for the link controller shown in FIG. 11.

FIG. 14 illustrates the rolling of path hunting requests through a switch having four pipe controllers according to the present invention.

DETAILED DESCRIPTION

Figure 1:
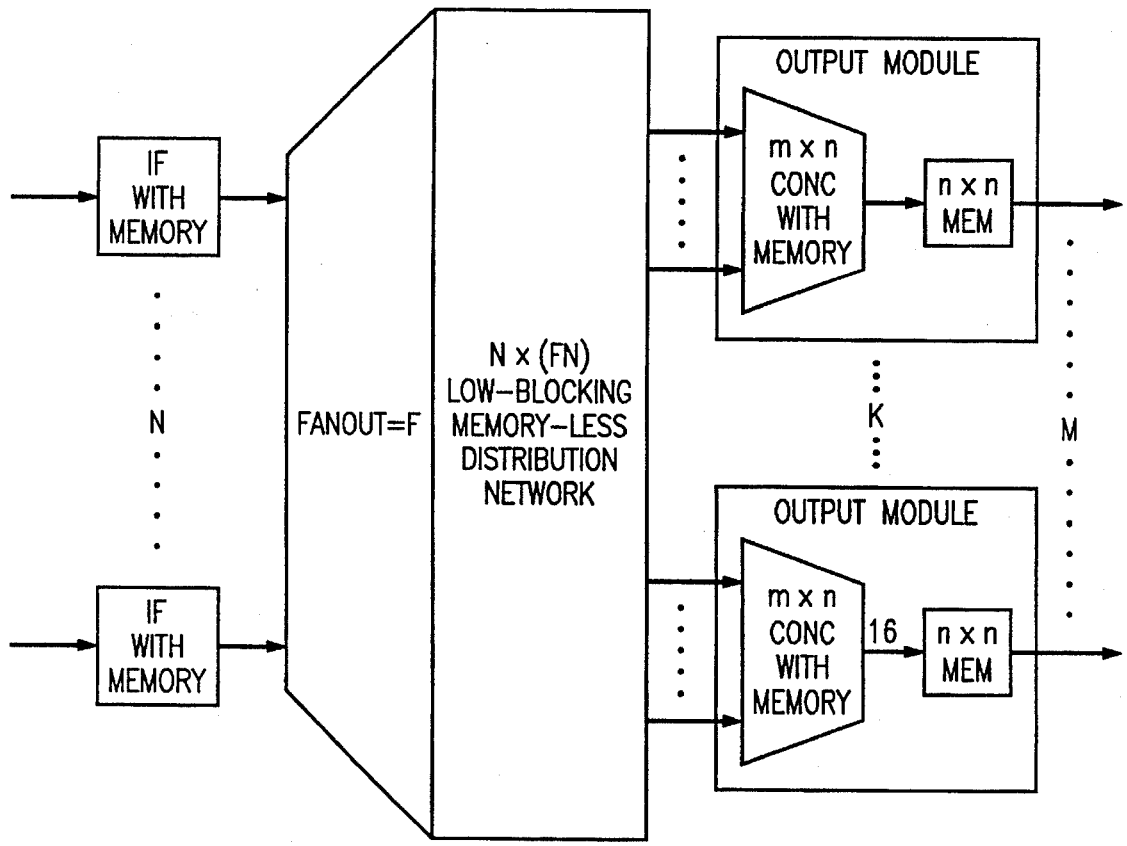
FIG. 1 is a block diagram of a generalized growable packet switch.
Figure 2:
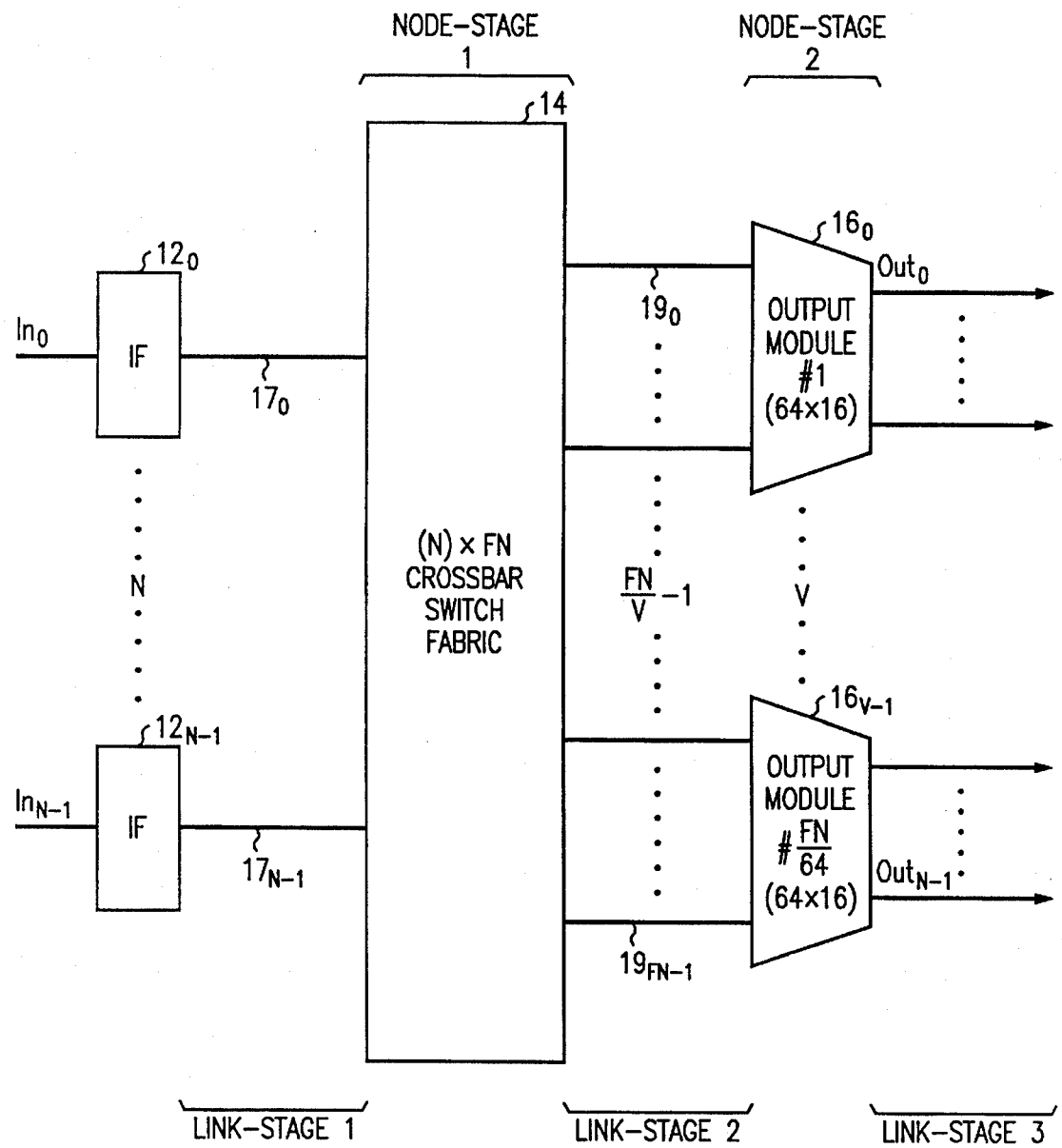
FIG. 2 is a slightly re-drawn FIG. 1.

Referring now to FIG. 2, a large, generalized switch 10 for ATM communications, is shown in block diagram form. ATM switch 10 has a number of input interfaces $12_0$–$12_{N-1}$, a switch fabric 14, and buffered output modules $16_0$–$16_{V-1}$. For ATM operation, input interfaces $12_0$–$12_{N-1}$, are high speed digital amplifiers that serve as a matching networks and power amplifiers for fanning out information received on their inputs to multiple input ports of the switch fabric 14. Each of the input interfaces $12_0$–$12_{N-1}$ also needs a capability to store one ATM cell, as will be explained below. Similarly for ATM operation, buffered output modules $16_0$–$16_{V-1}$ are concentrators that are buffered to reduce packet loss when two or more packets are directed to and contend for the same output of outputs $Out_0$–$Out_{N-1}$.

Switch fabric 14 includes a fanout F where each of the outputs from the input interfaces $12_0$–$12_{N-1}$ is fanned out to F inputs within switch fabric 14, such that if ATM switch 10 is an N×N switch then switch fabric 14 will have FN internal inputs and FN outputs to output modules $16_0$–$16_{V-1}$. Output Modules $16_0$–$16_{V-1}$ have a fanin or concentration factor of F in order to convert the FN outputs of the switch fabric 14 to N output module outputs $Out_0$–$Out_{N-1}$. Each output module $16_0$–$16_{V-1}$ stores arriving ATM packets in FIFO queues, and then routes the ATM packets at the front of each of these FIFO queues to their desired outputs $Out_0$–$Out_{N-1}$ when the output ports are available.

Switch fabric 14 is a general distribution network which may be a network of switches, specifically crossbar switches, to provide multiple paths from each of its input ports $17_0$–$17_{N-1}$ to each of its output ports $19_0$–$19_{FN-1}$. However, it becomes highly impractical to make an N×N switch out of a single crossbar to operate as the switching component of switch fabric 14 when the size of N exceeds 32. Thus, some other way is needed to realize the general architecture shown in FIG. 2.

Figure 3:
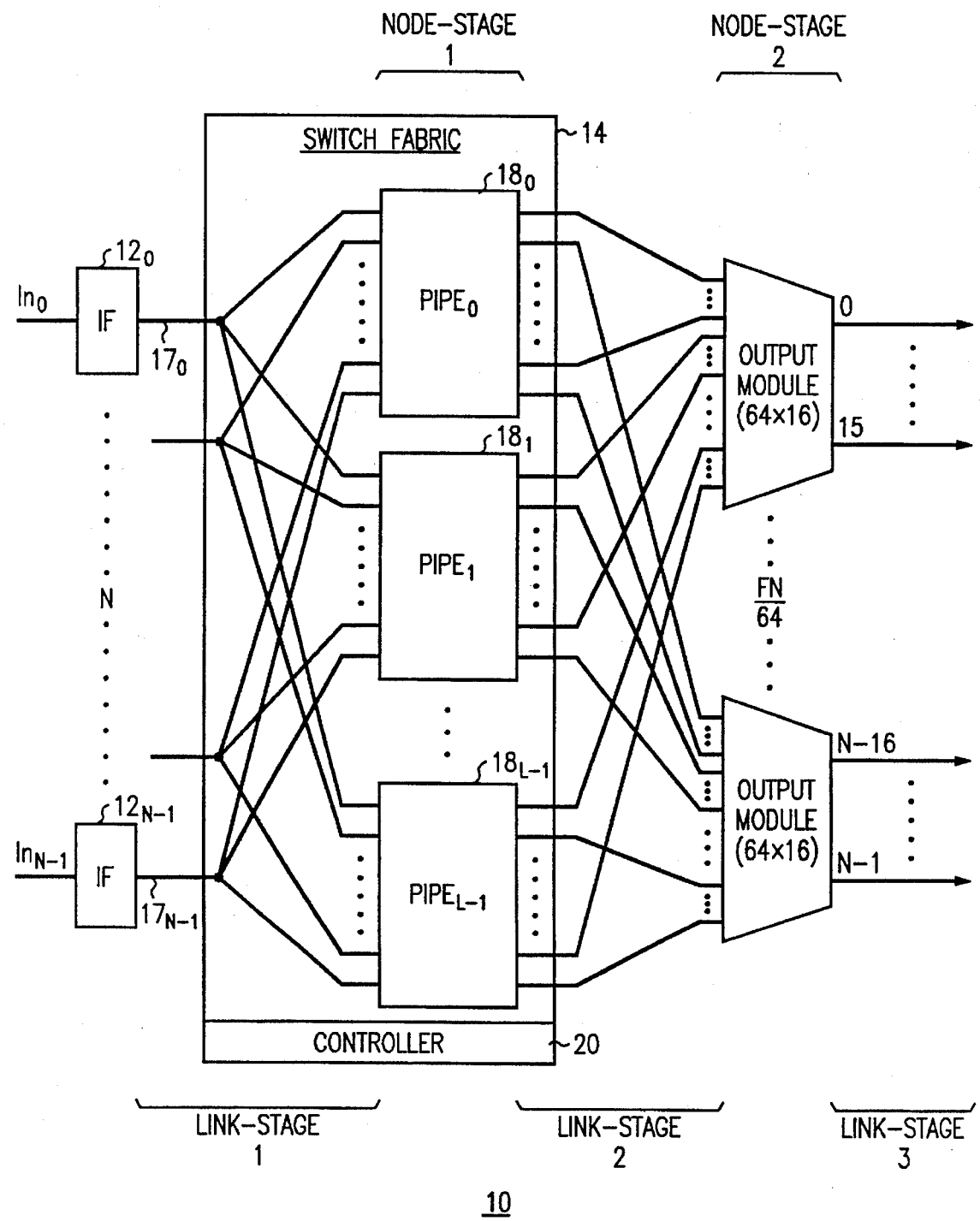
FIG. 3 is a block diagram of a growable packet switch in which the switch fabric is partitioned into L multiple pipes according to the present invention.

Referring now to FIG. 3, an ATM switch 10A that is both practical and possible for N inputs where the size of N is at least 256, is shown. Multiple paths from each input $17_0$–$17_{N-1}$ through the switch fabric 14A are provided to prevent blocking. These multiple paths are partitioned into groups called pipes with each pipe providing exactly one path between each input port $17_0$–$17_{N-1}$ and each output port $19_0$–$19_{FN-1}$ within the network. Thus, switch fabric 14A is made up of multiple pipes $18_0$–$18_{L-1}$. The output modules $16_0$–$16_{V-1}$ are essentially the same as the output modules shown in FIG. 2.

Switch fabric as seen in co-pending and commonly assigned application entitled TERABIT PER SECOND DISTRIBUTION NETWORK, which is hereby incorporated by reference, is a single stage, memoryless, and non-self routing network. Since the switch fabric 14A is not unconditionally non-blocking as a full N×N crossbar switch would be, a controller 20 is included to hunt for a path through the four pipes for each ATM cell. Since each of the pipes $18_0$–$18_3$ contains a path that could transport the ATM Cell, the real purpose of the controller 20 is to find a path that is not blocked.

For ATM switch 10A, if the number of input lines, N is equal to 256 and if each input line is operated at a standard 2.5 Gigabits per second data rate, its aggregate throughput will be 0.640 terabits per second. Scaling or growing such an ATM switch by a factor of two to 512 input lines and output lines should be straightforward and result in aggregate throughputs of greater than 1 Terabits per second. Scaling to an ATM switch size of 1024×1024 is considered within the present technology, and the architecture of the present invention is believed to be extensible even further as the speed of commercially available components increases and as new, faster technologies are developed.

Figure 4:
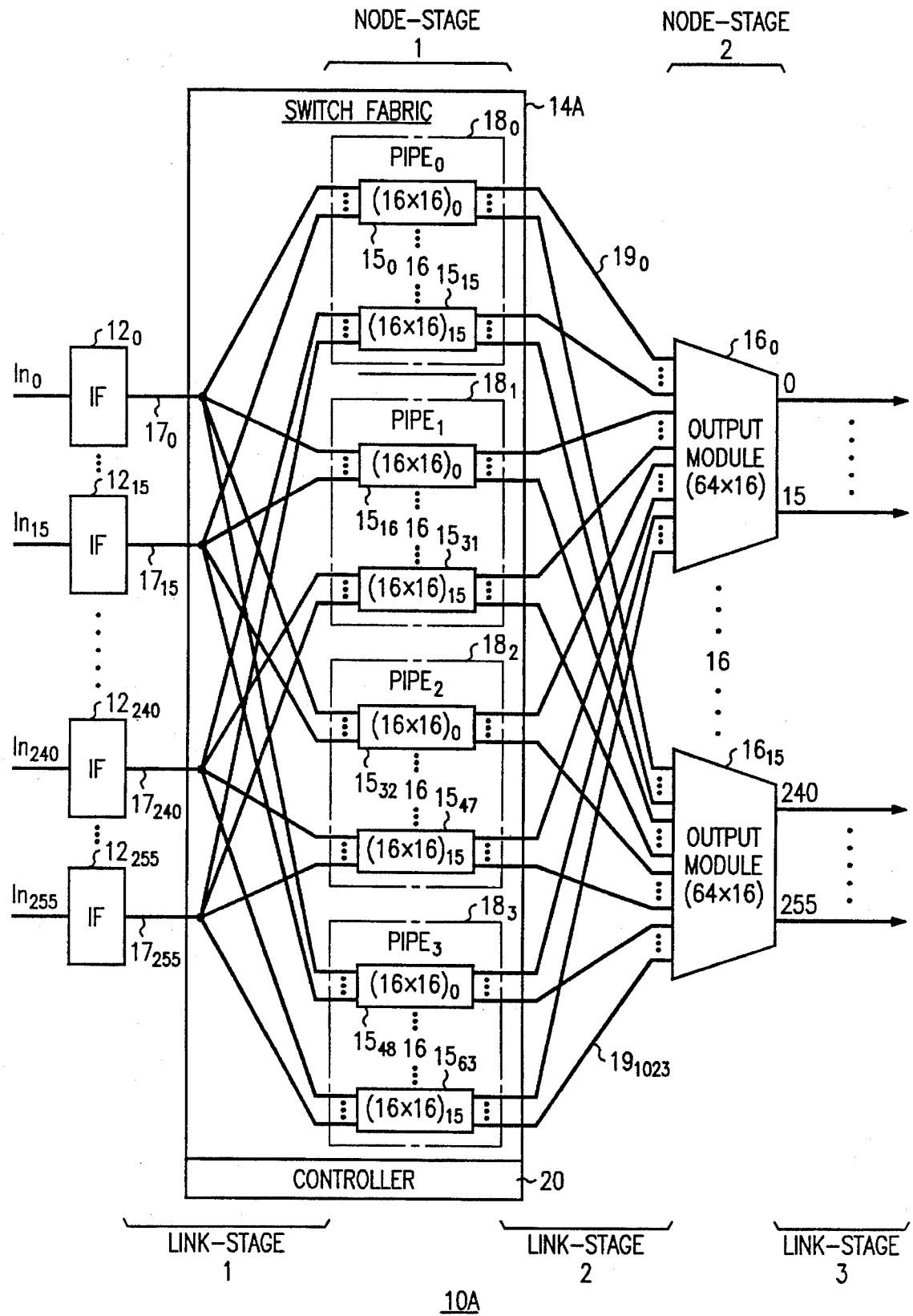
FIG. 4 is a block diagram, similar to FIG. 3, of a specific embodiment of the present invention having four pipes (L=4) and showing a configuration for the pipes.

Referring now to FIG. 4, a specific embodiment of an ATM switch 10A is shown. In this specific embodiment ATM switch 10A has two hundred fifty six input interfaces $12_0$–$12_{255}$ which are connected to two hundred fifty-six ATM input lines $In_0$–$In_{255}$. The outputs of the input interfaces are connected to the input ports $17_0$–$17_{N-1}$ of the switch fabric 14A. The switch fabric 14A contains a total of sixty-four 16×16 crossbar switches $15_0$–$15_{63}$ which are partitioned into four pipes $18_0$–$18_3$. The fanout F is equal to four which if the number of output ports=FN results in 1024 output ports $19_0$–$19_{1023}$. The output ports $19_0$–$19_{1023}$ are respectively connected to the inputs of sixteen 64×16 output packet modules $16_0$–$16_{15}$. The sixteen 64×16 output packet modules are connected to two hundred fifty six outputs $Out_0$–$Out_{255}$. Those skilled in the art will recognize that other combinations of components could have been used, for example thirty two 32×8 output modules could have been used instead of the 64×16 output modules shown in FIG. 4.

Figure 5:
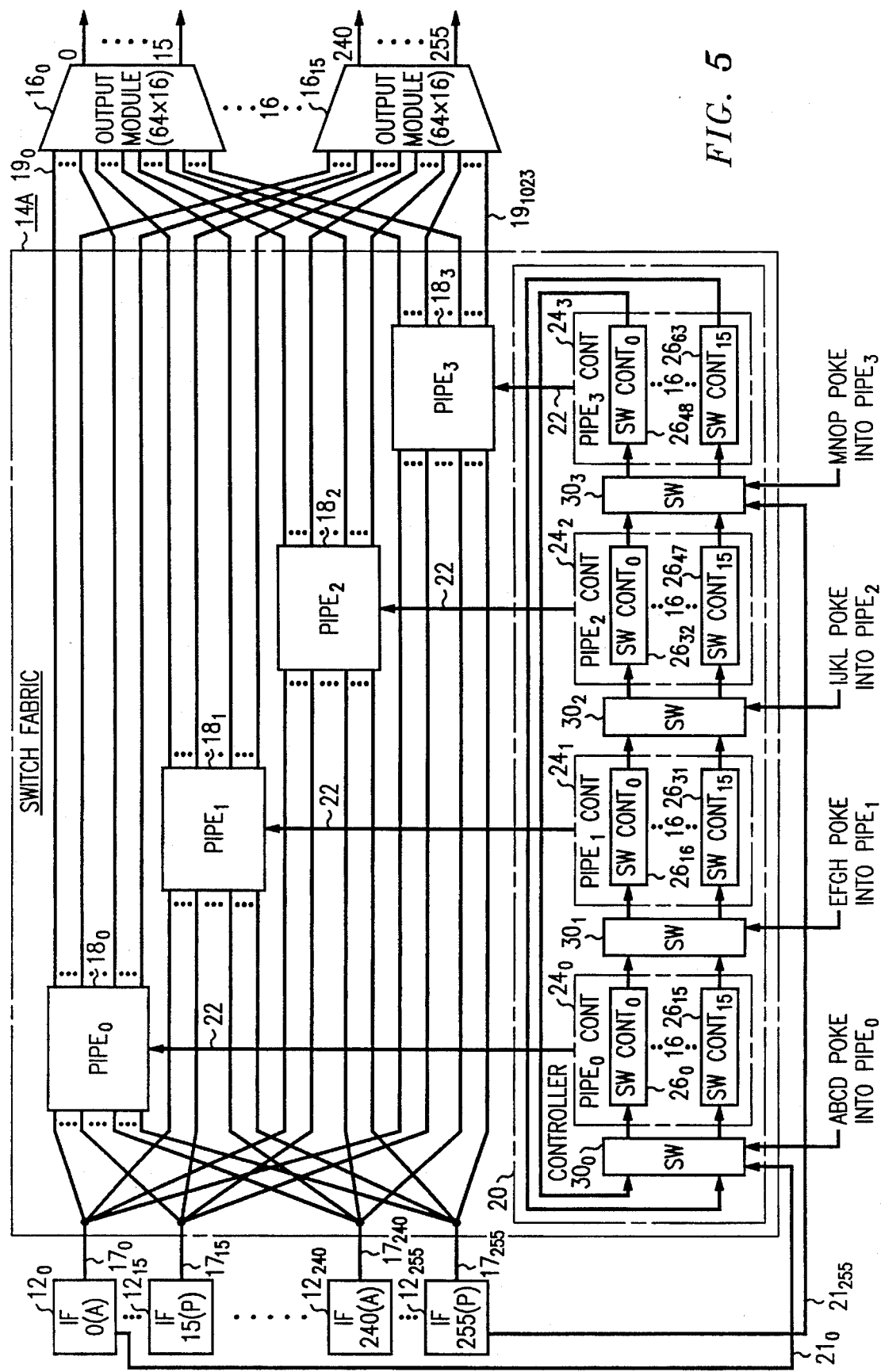
FIG. 5 is a simplified block diagram of the embodiment shown in FIG. 4 which shows greater details of the controller.

ATM switch 10A also has a controller 20 which has the tasks of hunting and finding an available pipe through the switch fabric 14A for each ATM packet. The controller 20 uses the fact that the switch fabric 14A is partitioned into four pipes to break the pipe hunting tasks into four parallel pipe hunting tasks that are each temporally shifted by an acceptable amount. Details of one embodiment of such a controller 20 are shown in FIG. 5.

For the 0.640 Terabits per second, N=256 embodiment mentioned previously and shown in FIGS. 4 and 5, the controller 20 may be contained on approximately eight printed circuit boards. Controller 20 would accept up to 256 sixteen-bit request vectors from up to 256 line input interfaces $12_0$–$12_{255}$ and perform path hunts on each of these request vectors within each 176 nanosecond. ATM cell interval to create the 1024 sixteen-bit connect vectors used to established connections within the switch fabric 14A. This requires that controller 20 operate with a processor clock rate of at least 46 megabits per second. This moderate clock rate permits the logic within the controller 20 to be implemented with off-the-shelf CMOS EPLD's or similar devices, thus making the cost of the controller 20 (in large quantities) very reasonable.

The movement of request vectors from the input interfaces $12_0$–$12_{255}$ to the controller 20 and the movement of connect vectors from the controller 20 to the crossbar switches $15_0$–$15_{63}$ of the switch fabric 14A is a challenging task, because large amounts of control information must be transported every 176 nano second ATM cell interval. For example, in an ATM switch containing 256 input interfaces, 256 16-bit request vectors must be transported to the controller 20 every 176 nano second, leading to an aggregate bandwidth of 23 Gigabits per second between the input interfaces sub-system and the controller 20 sub-system. In addition, 1024 16-bit connect vectors must be transported to the switch fabric 14A every 176 nano second to control the crossbars switches $15_0$–$15_{63}$. This requires an aggregate bandwidth of 93 Gigabits per second between the controller 20 subsystem and the switch fabric 14A sub-system. This 93 Gigabits per second connect vector information can be compressed into 29 Gigabits per second (given that only one input can be routed to an output during each ATM cell interval) by standard compression techniques. However, since this control information should be delivered with high reliability, all of the control connections or control links between these sub-systems should be dually redundant (not shown in FIG. 4), so there is actually 46 Gigabits per second of data moving between the input interfaces cards and the controller 20 and 58 Gigabits per second of data moving between the controller 20 and the switch fabric 14A. Preferably, high-speed serial links 22 will be used to transmit this control information. For such a case, input interfaces $120$–$12_{255}$ would be grouped by fours such that only sixty-four serial links would be required to move request vectors from the input interfaces $12_0$–$12_{255}$ to the controller 20, and 128 serial links would be required to move the resulting connect vectors from the controller 20 to the pipes $18_0$–$18_3$ (assuming the aforementioned data compression techniques are applied to the connect vectors).

While the use of out-of-band control techniques does require the additional hardware cost of these high-speed serial control links 22, these links 22 cause very little increase the overall system hardware cost. Considering that the 256-input ATM switch 10A of FIGS. 4 and 5 already has 1024 high-speed serial links required to route ATM cells between the input interfaces $12_0$–$12_{255}$, and the switch fabric 14A (when the fanout of four is included) and 1024 more high-speed serial links are used to route ATM cells from the switch fabric outputs $19_0$–$19_{1023}$ to the output packet modules $16_0$–$16_{15}$. Thus, the addition of the 192 serial links 22 for routing of the control information increases the total number of high-speed serial links within the system by merely nine percent.

Applying the calculations of Yeh et al. from the article "The Knockout Switch" the ATM cell loss probability of the ATM switch 10A shown in FIGS. 4 and 5 is $4.34 \times 10^{-3}$, assuming that the connections of the inputs is symmetrical and not independent as set forth in our co-pending application entitled "TERABIT PER SECOND DISTRIBUTION NETWORK". This cell loss probability falls short of the acceptable ATM cell loss probability of less than $1 \times 10^{-12}$ mentioned previously.

To reduce the ATM cell loss probabilities, controller 20 applies a temporal spreading technique known as rolling, which provides many statistical advantages. Rolling involves and fulfills three fundamental goals that are aimed at providing more evenly distributed traffic loads. These goals are: (1) spatially distribute the traffic evenly across all pipes $18_0$–$18_3$ so that one pipe will only carry its proportional fraction of the traffic load, (2) spatially distribute the traffic evenly across all of the 16×16 crossbar switches $15_0$–$15_{63}$ within each pipe $18_0$–$18_3$ so that each of the crossbar switches is equally loaded, and (3) temporally distribute the traffic that arrives in a given ATM cell period across two ATM cell periods so that the traffic load can be effectively decreased in an occasional ATM cell period when an unusually high volume of traffic exists and is destined for a particular output packet module. This effective lowering of the traffic load is accomplished by delaying some of the ATM cells arriving during a congested ATM cell interval. The cells are delayed until the next consecutive ATM cell interval when the traffic load competing for the popular resources, i.e. connections to popular output packet modules, will most likely be lower, so the delayed cells should have a higher probability of being routed in the next ATM cell interval. Since the switch fabric 14A is memoryless, the ATM cells that must wait for the next ATM cell interval are stored in their respective input interfaces $12_0$–$12_{255}$.

In addition to satisfying these three fundamental goals of packet traffic control to distribute the load, rolling also satisfies two further very important ATM system goals. First, goal (4) is that the ATM switch 10A must guarantee that ATM cell ordering can be simply maintained when an ATM stream is re-constructed at an output packet module $16_0$–$16_{15}$ even if rolling causes some of the ATM cells within the stream to be delayed differently than others. Secondly, goal (5) is that rolling must also guarantee that the controller 20 will attempt to route every ATM cell through each of the four paths to its desired output packet module, but each of the successive path hunt attempts must occur in a more lightly-loaded 16×16 crossbar switch so that the first attempt occurs in a 16×16 crossbar switch with many previously-routed ATM cells (and very few available paths to output packet modules) while the fourth and final path hunt attempt occurs in an 16×16 crossbar switch that is virtually empty (thereby providing many available paths to output packet modules). The rolling technique is similar to spatial path hunt techniques that pack as many calls as possible in one portion of a spatial network, which by forcing near 100% occupancy in parts of a system results in the remainder of the calls having a very high probability of being successfully routed through the remainder of the system if usage is below 100%. Thus, rolling in its fourth and final path hunt attempt provides a very high probability of an ATM cell successfully being routed. Goal (5), by packing many ATM cells in one portion of the network, superficially seems to conflict with goal (1) that requires the traffic be spatially distributed across the network. However, as will be explained below, temporal spreading provided by the rolling technique permits the network to simultaneously satisfy both goals (1) and (5).

Assuming that each of the 256 input ports $17_0$–$17_{N-1}$ of FIG. 4 has an ATM cell that needs to be routed through the distribution network, and assuming that the switch fabric 14A is composed of four pipes $18_0$–$18_3$, then the out-of-band controller 20 may be required to perform 256×4=1024 unique path hunts for the ATM cells before the cells can be routed. To distribute the ATM cells evenly across all four pipes, the 256 ATM cells requesting connections, the rolling technique divides the requests into four groups of equal size. The first group will have path hunts performed for its ATM cells in pipe $18_0$ first, then in pipe $18_1$, then in pipe $18_2$, and finally in pipe $18_3$. The second group will have path hunts performed for its ATM cells in pipe $18_1$ first, then in pipe $18_2$, then in pipe $18_3$, and finally in pipe $18_0$. The third group will have path hunts performed for its ATM cells in pipe $18_2$ first, then in pipe $18_3$, then in pipe $18_0$, and finally in pipe $18_1$. The fourth group will have path hunts performed for its ATM cells in pipe $18_3$ first, then in pipe $18_0$, then in pipe $18_1$, and finally in pipe $18_2$. This ring-like ordering of the path hunts guarantees that the routed ATM cells are distributed evenly across all four pipes. In addition, if the ATM cells within each of the four equally sized groups are selected such that the ATM cells within a single group can be routed into exactly four of the 16 inputs on any 16×16 crossbar switch, then the routed ATM cells will also be evenly distributed across all of the 16×16 crossbar switches.

Referring now to FIGS. 5 and 6, a timing diagram for a rolling technique according to the present invention is described. To satisfy goals (1), (2), and (5) simultaneously, the out-of-band controller 20 uses the time delay/time distribution described in goal (3), and these ATM cell delays required by goal (3) must be provided during each ATM cell interval. In all cases, when a group of ATM cells is passed around the ring-like structure of controller 20 from pipe $18_3$ to pipe $18_0$, the controller 20 re-assigns the cells to the next ATM cell interval (period) which requires that the ATM cells be delayed by one cell period. Because of this re-assignment and delay, each cell group encounters a very lightly-loaded set of 16×16 crossbar switches for its fourth and final path hunt. An additional advantage of this rolling technique using re-assignment and delay of ATM cell intervals is that it also allows more than 64 simultaneously arriving ATM cells to be routed through the switch fabric 14A to any single output packet module $16_0$–$16_{15}$ (even though there are only 64 connections or links from the switch fabric 14A to each output packet module $16_0$–$16_{15}$). This is occurs with the rolling technique because all of the ATM cells do not need to be routed during the same ATM cell interval. Thus, the rolling technique when used in the out-of-band controller 20 results in extremely low cell loss probabilities both within the switch fabric 14A and the output modules $16_0$–$16_{15}$, even during a transient cell interval that has an extraordinarily high traffic load.

The one ATM cell period delays incurred by some of the ATM cells as they are routed through the switch fabric 14A would normally lead to the conclusion that there would be difficulties in satisfying goal(4) of maintaining proper cell ordering. However, the ring-like ordering of the path hunts within the out-of-band controller 20 guarantees that delayed cells in a stream of ATM cells will always be routed through lower-numbered pipes than non-delayed cells (where pipe $18_0$ is the lowest-numbered pipe and pipe $18_3$ is the highest-numbered pipe). This information, coupled with the fact that ATM cells are delayed by at most one cell period, ensures that proper cell ordering will be maintained if the cells are extracted from the switch fabric 14A and loaded into first-in-first-out queues $174_0$–$174_{63}$ (shown in FIG. 7) of each output module of the output modules $16_0$–$16_{15}$ in the order of the lowest numbered pipe to the highest numbered pipe: pipe $18_0$, pipe $18_1$, pipe $18_2$, and pipe $18_3$.

Figure 7:
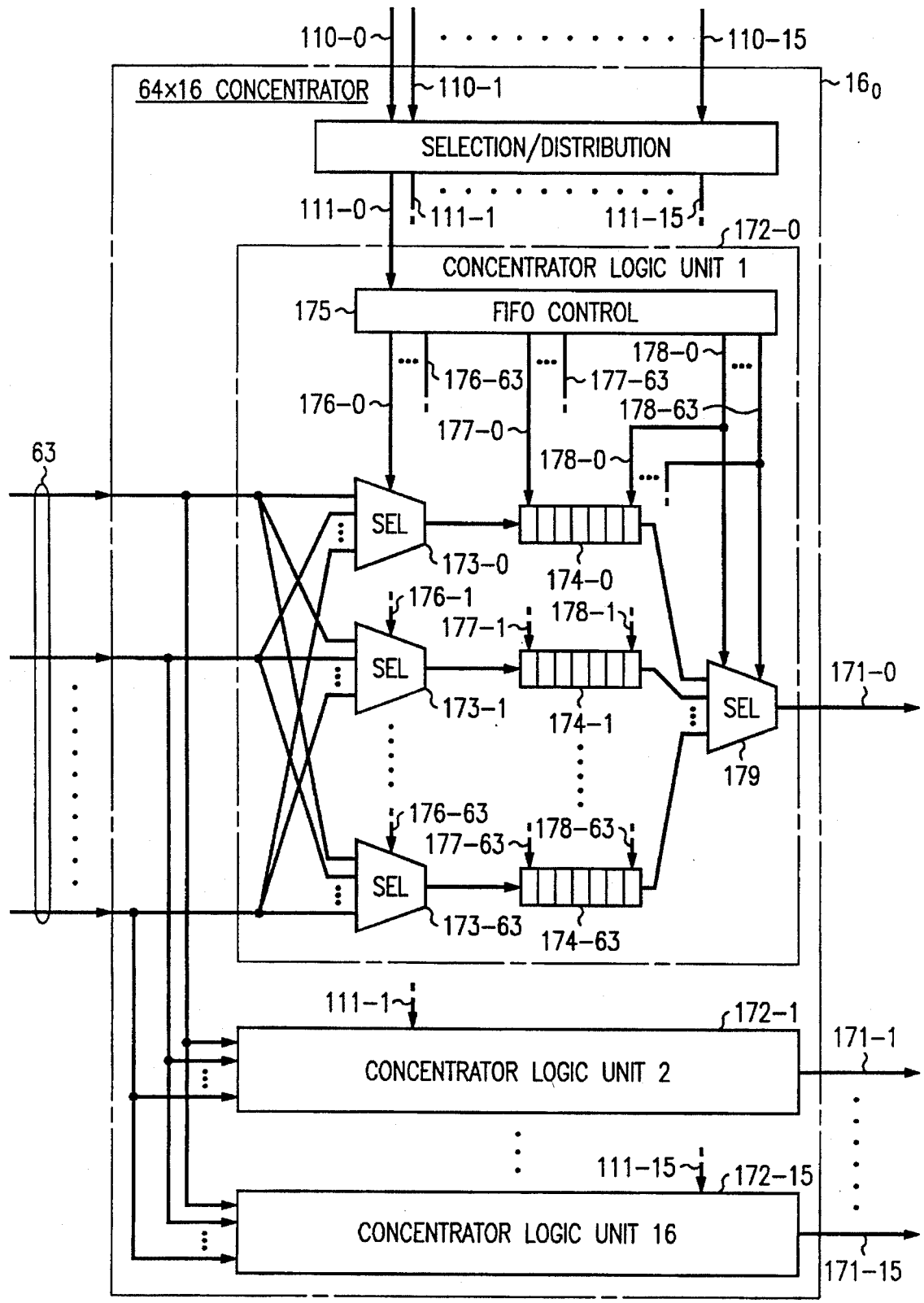
FIG. 7 is a simplified block diagram of an embodiment of an output module.

Referring now to FIG. 7, the output module $16_0$ (and the fifteen other output modules $16_1$–$16_{15}$) may be a 64×16 embodiment of the concentrator described in U.S. patent application Ser. No. 08/242,217, entitled "ASYNCHRONOUS TRANSFER MODE SWITCH ARCHITECTURE", filed May 13, 1994, by Cyr et al. now U.S. Pat. No. 5,412,646 and commonly assigned to the assignee of the present invention, which application is hereby incorporated by reference. The output module $16_0$ in FIG. 7 is a specific case of the generalized concentrator shown in FIG. 4 of the above-referenced patent application of Cyr et al. Since the output modules $16_0$–$16_{15}$ are well described in the above referenced application, in the interest of brevity they will not be further described here.

Figure 8:
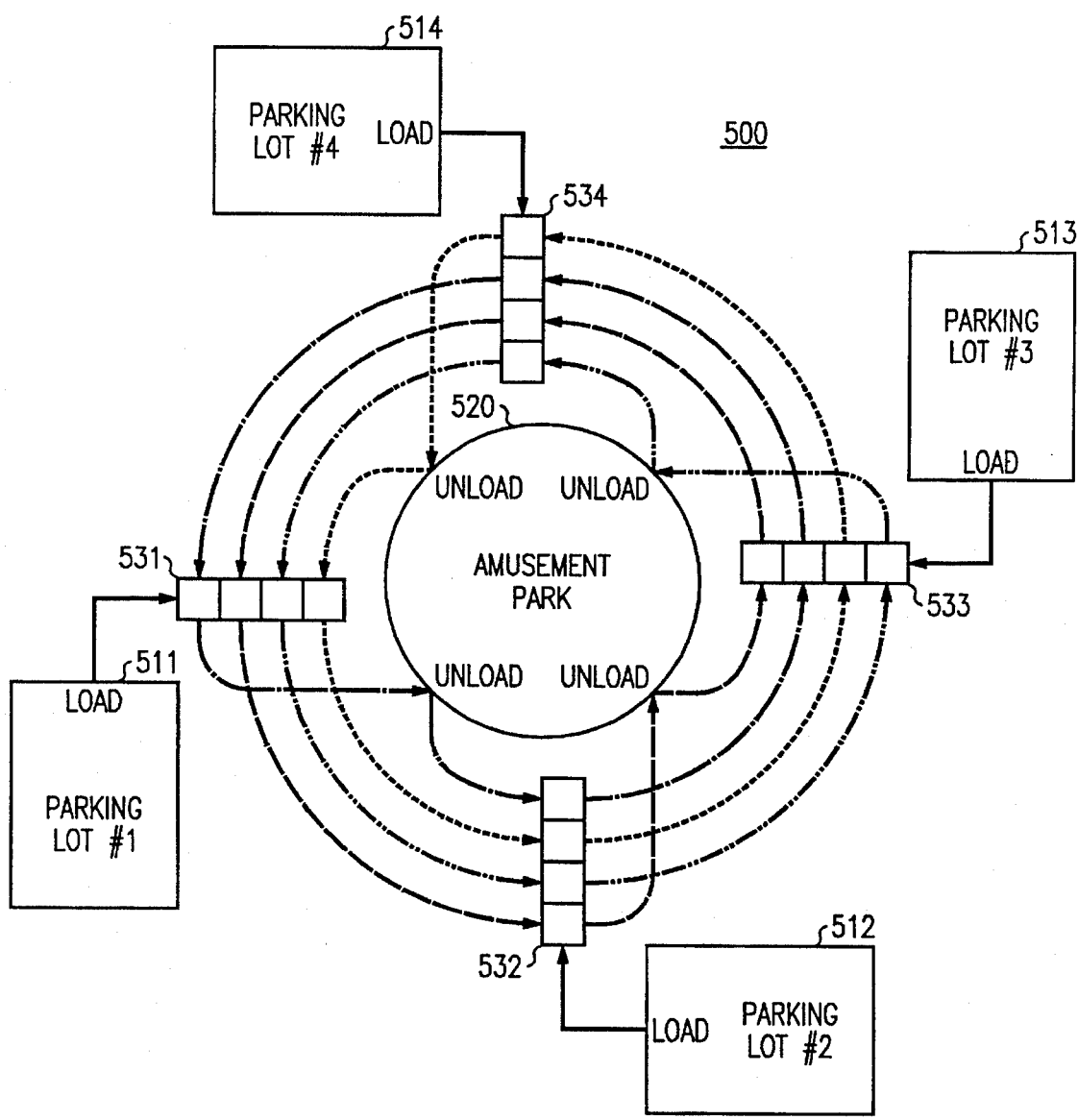
FIG. 8 is an illustrative example of rolling and its operation in a plan view of an amusement park and its satellite parking lots.

To provide a better understanding the equation of the rolling technique, a real-life analogy will be described with respect to FIG. 8, which is a plan view of an amusement park system 500. Consider the problem of transporting a large number of people from amusement park parking lots 511, 512, 513, or 514 to the amusement park 520 using trams to shuttle the people between the two points. Tram system 530 is composed of four tram shuttle trains each with a predetermined route, which is analogous to the four pipes of switch fabric 14A. Each tram shuttle train contains sixteen cars (representing the 16×16 crossbar switches within a particular pipe), and each shuttle car is equipped with sixteen seats (representing the output links emanating from a single 16×16 crossbar switch). In this analogy, each customer (representing an ATM cell) arrives in one of four parking lots 511, 512, 513, or 514 surrounding the amusement park 520. As a result, each customer is instantly placed in one of four groups, and since the parking lots 511–514 are the same size, each group contains an equal number of customers on the average. The customers in any single parking lot 511, 512, 513, or 514 must then divide up and stand in one of sixteen lines, where each line is associated with a respective car of the tram shuttle train. The amusement park 520 is sub-divided into sixteen different theme areas (The Past Land, The Future Land, etc.), and each of the sixteen seats of a particular tram car is labeled with the theme area to which that seat's occupant will be given admission. Before arriving in the parking lot, each customer must randomly chose one of the sixteen theme areas (representing the sixteen output packet modules $16_0$–$16_{15}$) where he or she wishes to spend the day. Customers must then find an available seat associated with their desired theme area on one of the four trams that passes by the loading area $53_1$, $53_2$, $53_3$, or $53_4$ of their parking lot. If a customer has not found an available seat after four trams have passed by, then he or she is not permitted to enter the amusement park during that day (This harsh condition represents the loss of an ATM cell due to blocking in all four pipes of the distribution network, a small but finite possibility).

The first tram that stops at the loading area that the customer can try has already visited three other parking lot loading areas, so the customer's pre-specified seat may be full. However, if the customer does find his or her seat to be vacant on that tram, then the tram will deliver him or her straight to the amusement park 520. If the customer fails to get on the first tram, he or she must wait and try the second tram which has already visited two other parking lot loading areas. If the customer is successful at finding his or her pre-specified seat on the second tram, that tram will deliver the customer to the amusement park 520 after one more parking lot stop. If the customer fails to get on the first tram and the second tram, then he or she must wait and try the third tram which has only visited one other parking lot loading area. If the customer is successful at finding his or her seat on the third tram, that tram will deliver him or her to the amusement park 520 after two additional parking lot stops. If the customer fails to get on any of the first three trams, then the customer must wait and try the fourth and final tram. Fortunately, this tram has not visited any parking lots yet, so the arriving tram is empty, and the customer's seat will be taken only if another customer in his/her parking lot line is also trying for the same seat. The system 530 satisfies goal (5), because each of the successively arriving trams is more lightly-loaded than the previous one. Thus, a controller 20 rolling ATM cells indeed can fulfill goals (1), (2), and (5).

The rolling technique if used by itself improves the ATM cell loss probability of ATM switch 10A from $4.34 \times 10^{-3}$ to approximately $10^{-11}$. Using the analysis techniques of the article "A Growable Packet Switch Architecture" the cell loss probabilities for an ATM switch 10A that has independent connections to the inputs of the switch fabric 14 according to Galois field theory and also has an out-of-band controller 20 that incorporates rolling techniques can be analytically modeled and calculated. Each of the 16×16 crossbar switches in pipe $18_0$ receives an offered traffic load equal to Ra=$R_L/4$+Rres, where Rres is defined to be the fraction of the 16 inputs to a 16×16 crossbar switch that are blocked in pipe $18_3$ and routed to pipe $18_0$ for a re-attempt. For a first attempt at solving for the cell loss probability, let us assume that Rres=$R_L/16$. Thus, the cell loss probability of a single 16×16 crossbar switch in pipe $18_0$ can be determined using the equation of Eng et al.

$$P(\text{cell loss}) = [1 - m/(nR_L)] \left[ 1 - \sum_{k=0}^{m} \{(nR_L)^k e^{(-nR_L)}\}/k! \right] + (nR_L)^m e^{(-nR_L)}/m!;$$

where m=1, n=1, and the switch loading is given by Ra=$R_L/4$+$R_L/16$. Using these assignments, the resulting cell loss probability for a fully-loaded ($R_L$=1.0) pipe $18_0$ 16×16 crossbar switch can be calculated to be:

$P(\text{cell loss in pipe } 18_0) = 1.3 \times 10^{-1}$.

Thus, the fraction of the 16 inputs to a 16×16 crossbar that are passed to the second pipe after the first attempt is given by:

$fl-2 = Ra \times P(\text{cell loss in pipe } 18_0) = (3.13 \times 10^{-1})(1.3 \times 10^{-1}) = 4.06 \times 10^{-2}$.

By symmetry, this should have also been the same as the fraction of inputs that are passed from pipe $18_3$ to pipe $18_0$, so the residue assumption of $R_L/16$=0.062 above was incorrect. By refining this assumption and performing a second attempt, and now assuming that Rres=$R_L/32$. Thus, the cell loss probability of a single 16×16 crossbar switch in pipe $18_0$ can be determined again using the equation of Eng et al., where m=1, n=1, and the switch loading is given by Ra=$R_L/4$+$R_L/32$. Using these assignments, the resulting cell loss probability for a fully-loaded ($R_L$=1.0) pipe $18_0$ 16×16 crossbar switch is calculated to be:

$P(\text{cell loss in pipe } 18_0) = 1.2 \times 10^{-1}$.

Thus, the fraction of the 16 inputs to a 16×16 crossbar that are passed to the second pipe after the first attempt is given by:

$fl-2 = Ra \times P(\text{cell loss in pipe } 18_0) = (2.81 \times 10^{-1})(1.2 \times 10^{-1}) = 3.37 \times 10^{-2}$.

This calculation result is very, close to the assumed value of Rres=$R_L/32$=$3.13 \times 10^{-2}$, so the assumption is considered to be satisfactory. The blocked cells are sent to pipe $18_1$ for subsequent path hunting, and they encounter a negligible number of ATM cells from previous attempts. Thus, the 16×16 crossbar switch in pipe $18_1$ can be modeled for analysis as a growable packet switch, with m=1, n=1, and Ra=fl–2, and the resulting cell loss probability of this model is $1.4 \times 10^{-21}$. The fraction of the 16 inputs to the 16×16 crossbar in pipe $18_1$ that are passed to the pipe $18_2$ is $4.2 \times 10^{-4}$. Similar arguments can be used to show that the resulting cell loss probability for cells entering pipe $18_2$ is $1.9 \times 10^{-4}$, and the resulting fraction of the 16 inputs to a 16×16 crossbar passed to pipe $18_3$ is $7.9 \times 10^{-8}$. The resulting ATM cell loss probability in pipe $18_3$ is $3.7 \times 10^{-8}$, and the fraction of the 16 inputs to a 16×16 crossbar not routed in pipe $18_3$ (and therefore not routed in all four pipe attempts) is $2.9 \times 10^{-15}$. Thus, through the use of the rolling techniques within the out-of-band controller 20, the ATM cell loss probability of an ATM switch 10A with independent connections at the inputs of its switch fabric 14A can be decreased from an unacceptable value of $1.47 \times 10^{-6}$ to an acceptable value of $2.9 \times 10^{-15}$.

A preference technique may be used in conjunction with the rolling technique described above to decrease the cell loss probability of an ATM switch 10A even further. Referring back to FIG. 8 and the amusement park analogy, some form of arbitration was required at the tram loading areas to determine which of the customers in the line will be given a particular seat on the tram when more than one customer is requesting the same seat. Similarly, the out-of-band controller 20 must provide an arbitration scheme for selecting which of the arriving ATM cells will be assigned a particular link whenever two or more cells request access to the same link. The arbitration scheme used can have an advantageous effect on the ATM cell loss probabilities.

One possible arbitration scheme is a random scheme to determine which of the ATM cells is assigned the link. The random selection scheme is the scheme assumed for the analysis of the rolling technique presented above. However, other arbitration schemes are possible, and one particular arbitration scheme that has advantageous results is called the preference scheme. The preference arbitration scheme assigns a preference weight to each of the ATM cells in a particular grouping. ATM cells with higher preference weights are given precedence over ATM cells with lower preference weights whenever two or more cells request access to the same link. As a result, an effective hierarchy is created within the groupings of ATM cells.

The creation of a hierarchy may superficially seem to produce undesirable characteristics within the switch fabric 14A, because customers with high preference weights will be offered better service than customers with low preference weights. In fact, the one customer with the highest preference weight within each group can never have his or her ATM cell blocked by another customer's ATM cell. Although this may seem unfair, a detailed analysis of the effects of imposing this hierarchy indicates that it actually leads to improved performance, i.e. lower cell loss probabilities, for all customers—even for the customer at the bottom of the hierarchy with the very lowest preference weight.

Figure 9:
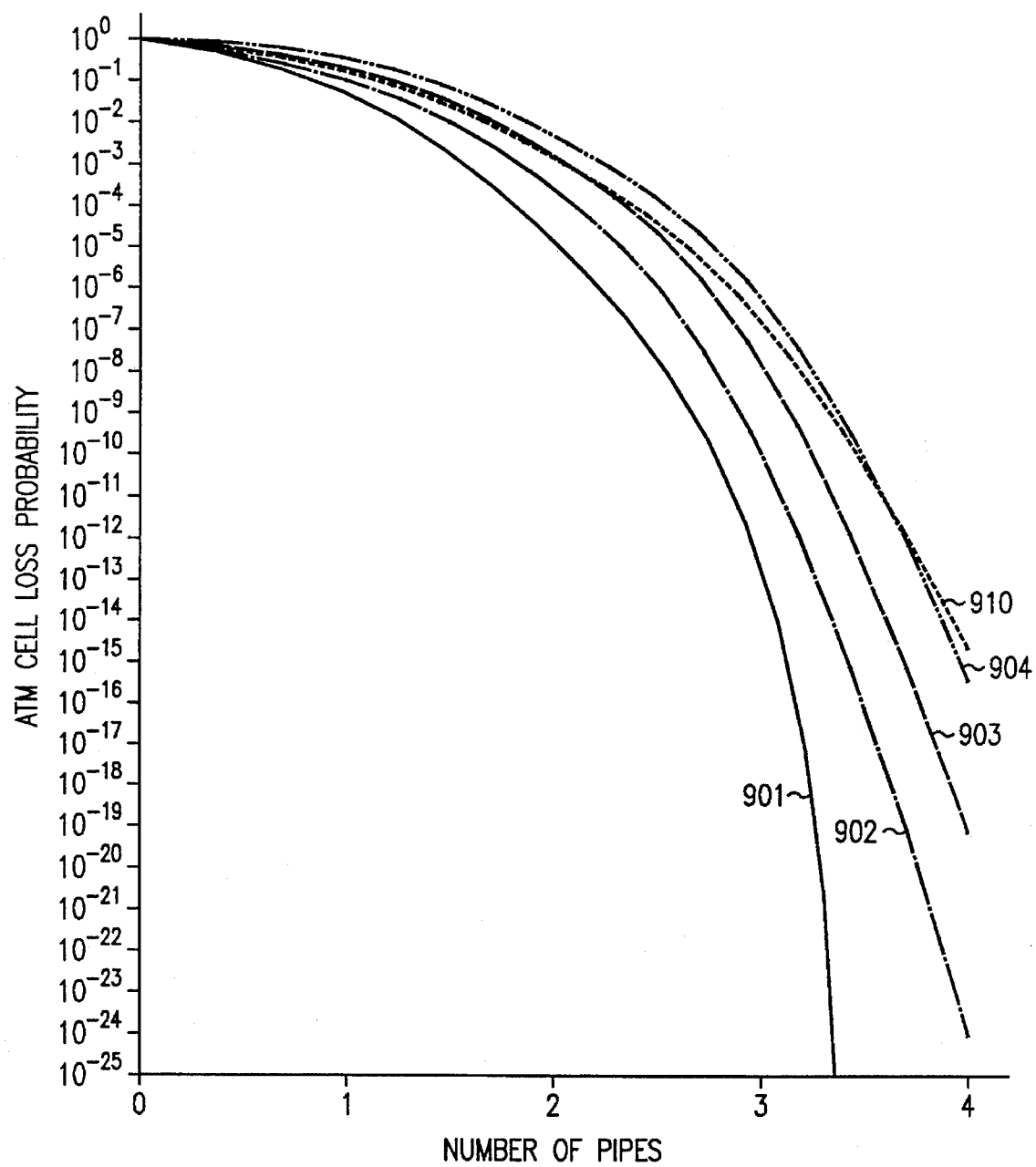
FIG. 9 shows plots of calculated values of various ATM cell loss probabilities both with and without the assignment of preferences.

The results of this analysis are summarized in FIG. 9, where the probability of loss of an ATM cell; i.e., the probability of a cell not being assigned to an available path, is shown as a function of the number of path hunts that were attempted in different pipes by the out-of-band controller 20. In this analysis, it was assumed that the group sizes were four- i.e., up to four ATM cells could simultaneously compete for access to the same link. As a result, four different preference weights were assigned to create a hierarchy for the four input ports associated with each group. The preference weight associated with a particular input port is assumed to be a fixed constant that does not vary with time. The resulting plots 901, 902, 903 and 904 in FIG. 9 indicate that the cell loss probability decreases as more path hunts in more pipes are performed, but it also shows that the inputs with the lower preference weights 903, 904 have higher cell loss probabilities than the inputs with higher preference weights 901, 902, as might be expected. Super-imposed on these plots is a similar plot 910 which indicates the probability of not being served when a random selection arbitration scheme is used instead of the hierarchy arbitration scheme. The surprising and unexpected results are that after path hunt attempts in four different pipes, the random selection arbitration scheme produces cell loss probabilities which are higher than the average of the cell loss probabilities for the hierarchy arbitration scheme. In fact, the plot 910 of the random selection arbitration scheme shows an average cell loss probabilities for all of the input ports which are notably higher than the plots 903 and 904 which are the average cell loss probabilities for even the input ports with the lowest preference weights within the hierarchy arbitration scheme. This phenomenon can be explained by the fact that after three sets of path hunts in three different pipes, the distribution of ATM cell requests entering the fourth pipe is very different depending on whether the random or preferences arbitration scheme is used. In the random selection arbitration scheme, there is a small but equal probability that all of the ATM cells are requesting a path. However, in the hierarchy arbitration scheme, most of the ATM cells with higher preference weights will be requesting a path with a probability of practically zero, while the ATM cell with the lowest preference weight will be requesting a path with a sizable probability, because that particular ATM cell may have been denied access to links in all three of its previous path hunt attempts. However, a single request arriving with a high probability at the fourth and last path hunter in the controller will lead to more routed ATM cells than many requests arriving with low probability, because the single request can always be satisfied since contention for an output link will never occur.

As a result, it seems apparent from the plots in FIG. 9 that by assigning preference weights to the input ports and by using a hierarchy arbitration method to resolve link contention and route paths in the out-of-band controller, the worst-case cell loss probability of the switch fabric 14A can be decreased from $2.9 \times 10^{-15}$ that was achieved by the introduction of the rolling technique to an even lower value of $2.4 \times 10^{-16}$. It is worth noting that input ports that are assigned higher preference weights will encounter even lower cell loss probabilities as indicated in FIG. 9.

Referring back to FIG. 5, in order to provide a physical embodiment of the rolling and preference methods, the ATM switch 10A is segmented in to four basic sub-systems. These four sub-groups consist of the input interfaces $12_0$–$12_{255}$, the output modules $16_0$–$16_{15}$, the switch fabric 14A, and the out-of-band controller 20.

The input interfaces $12_0$–$12_{255}$ within the network provide the necessary interfaces between the incoming transmission links and the links connected to the switch fabric 14A and the out-of-band controller 20. As a result, the input interfaces $12_0$–$12_{255}$ must provide a termination for the input transmission line. For example, if the input transmission line is a SONET link, then the input interface must provide for clock recovery, link error detection, SONET pointer processing and frame delineation, ATM cell extraction, and an elastic storage function to synchronize the arriving ATM cells to the system clock within the distribution network. The extracted ATM cells are then loaded into a FIFO buffer of the input interface. The input interface must also read ATM cells from the FIFO buffer and extract the ATM header from the cell. The VPI/VCI field of each ATM header is then used as an address into a translation table located on the input interface. The output of the translation table provides a new VPI/VCI field and the address of the output packet module to which the ATM cell is to be routed. The new VPI/VCI field is written into the ATM cell as a replacement for the old VPI/VCI field, while the output module address is routed as a request vector to the out-of-band controller 20 for the controller fabric 14A. Since the amount of processing time required by the out-of-band controller 20 is a fixed value, the input interface simply holds the ATM cell in a buffer until the out-of-band controller 20 has completed its path hunt and has relayed the results into the switch fabric 14A. Once the switch fabric 14A is loaded with the new switch settings to appropriately route the ATM cell, the input interface can inject the ATM cell into the switch fabric 14A and it will be automatically routed through the switch fabric 14A to its desired output module $16_0$–$16_{15}$. It should be noted that each input interface $12_0$–$12_{255}$ actually is provided with one link to each of the four pipes $18_0$–$18_3$ of the switch fabric 14A. In addition, the use of rolling (i.e. temporal spreading) within the switch fabric 14A may require a copy of the ATM cell to be injected into each of the four links during any one of two consecutive ATM cell intervals. As a result, the timing within the input interfaces $12_0$–$12_{255}$ must be tightly coupled and synchronized to the timing of the rest of the sub-systems within the ATM switch 10A.

Each of the two hundred fifty six input interfaces $12_0$–$12_{255}$ in FIG. 5 are numbered with an address ranging from 0 to 255, but each input interface is also assigned an alias address given by a letter between A and P. These alias addresses are used to identify which input port the input interfaces will connect to within the switch fabric 14A. The actual set of four crossbar switches to which a particular input interface is connected is determined by the Galois field techniques that were described previously. These techniques guarantee independence between all of the inputs on any 16×16 crossbar switch of any pipe.

Each of the sixteen output modules $16_0$–$16_{15}$ in FIG. 5 is labeled with addresses ranging from AA to PP, and each output module performs an important function within the ATM switch 10A. Each of the output modules $16_0$–$16_{15}$ within FIG. 5 provides terminations for a respective set of sixty-four links emanating from the switch fabric 14A. Each output module $16_0$–$16_{15}$ also provides two basic functions: it provides a small degree of space switching to route each ATM cell arriving on one of the sixty-four inputs to the desired one of the sixteen output ports, and it provides buffering of ATM cells to handle the problems associated with multiple packets that are simultaneously destined for the same output $Out_0$–$Out_{255}$.

There are many ways for these two functions to be implemented. The most straight-forward approach would probably construct a shared memory switch that could perform sixty-four memory writes and sixteen memory reads within an ATM cell interval (176 nano second). The memory could then be treated as sixteen disjoint linked lists (one for each output $Out_0$–$Out_{255}$) along with a seventeenth linked list containing idle memory locations. Although simple, this approach requires eighty memory accesses every 176 nano second, so it would demand memories with 2.2 nano second access times. An alternate approach would split each 64×16 output module $16_0$–$16_{15}$ into a 64×16 concentrator and a 16×16 shared memory switch. The concentrator would be a memory system that provides for sixty-four writes and sixteen reads every ATM cell interval, but the memory size could be small (and memory speeds could be fast) since the buffering required for output contention problems is not provided in this memory. In addition, the 64×16 concentrator could be implemented as a single linked list spread out across sixty-four distinct memory chips. As a result, each memory chip would require only one write and up to sixteen reads for every ATM cell interval. The 16×16 shared memory switch only performs thirty-two memory accesses every ATM cell interval, so slower (and larger) memories could be used, and the buffering for output contention problems could be provided in this shared memory portion of the output module. Thus, this latter arrangement is the more practical alternative for an output module.

The switch fabric 14A is essentially a group of small circuit switches that provide the required connectivity between the input interfaces and the output modules in response to the control signals generated by the out-of-band controller 20. In the embodiment of the ATM switch 10A shown in FIG. 5, the switch fabric 14A is composed of sixty-four 16×16 crossbar switches, where disjoint groups of sixteen switches comprise a pipe. The four pipes are labeled pipe $18_0$, pipe $18_1$, pipe $18_2$, and pipe $18_3$, and the sixteen 16×16 crossbar switches within a given pipe are labeled switch 0–15. The crossbar switches must be capable of receiving the control signals generated by the out-of-band controller 20 and must reconfigure all of the switch settings during a guard-band interval between consecutive ATM cells. Each 16×16 crossbar switch supports sixteen inputs labeled input A through input P, and each 16×16 crossbar switch also supports sixteen outputs labeled output AA to output PP. It was noted above that each input interface connects to a different 16×16 crossbar in each of the four pipes $18_0$–$18_3$, but it should now be noted that an input interface that connects to input X in pipe $18_0$ is required to be connected to input X in the other three pipes $18_1$–$18_3$ as well, where X is an element of the set {A,B, . . . , P}. The actual connections between the input interfaces $12_0$–$12_{255}$ and the crossbar switches within the switch fabric 14A are determined using Galois field theory techniques that were referenced above. These techniques guarantee independence between input ports for routing within switches in each pipe of the switch fabric 14A. FIG. 5 also illustrates that output YY from each of the sixty-four crossbar switches is routed to one of the sixty-four inputs on the 64×16 output module labeled YY, where YY is an element of the set {AA,BB, . . , PP}.

The basic function of the out-of-band controller 20 for the switch fabric 14A is to determine through which of the four pipes $18_0$–$18_3$ a particular ATM cell may be routed. Once the out-of-band controller 20 has successfully determined a pipe through which the ATM cell is to be routed without being blocked, the task of setting up the path through the pipe is simple, because by the definition of a pipe, there will exist only one path within the pipe between the input port of the arriving ATM cell and the desired output module. As a result, the fundamental path hunting task of a switching network is essentially reduced to the simpler task of pipe hunting in the ATM switch 10A.

The out-of-band controller 20 still requires a large busy-idle table to identify the status of each of the intermediate (FN) links between the 16×16 crossbar switches of the switch fabric 14A and the output modules $16_0$–$16_{15}$ as busy and unavailable or idle and available. However, this large busy-idle table may be sub-divided into many small busy-idle tables that the controller 20 can access in parallel, and thereby perform many pipe hunting operations in parallel. There are many ways to implement the controller 20 for a large switch having the general growable packet switch architecture. In the extreme case, four levels of parallelism may be applied to the architecture of the controller 20 to perform pipe hunting. One embodiment that uses three levels of parallelism will be described in detail, first and then a fourth level of parallelism for the controller 20 will be discussed.

Figure 10:
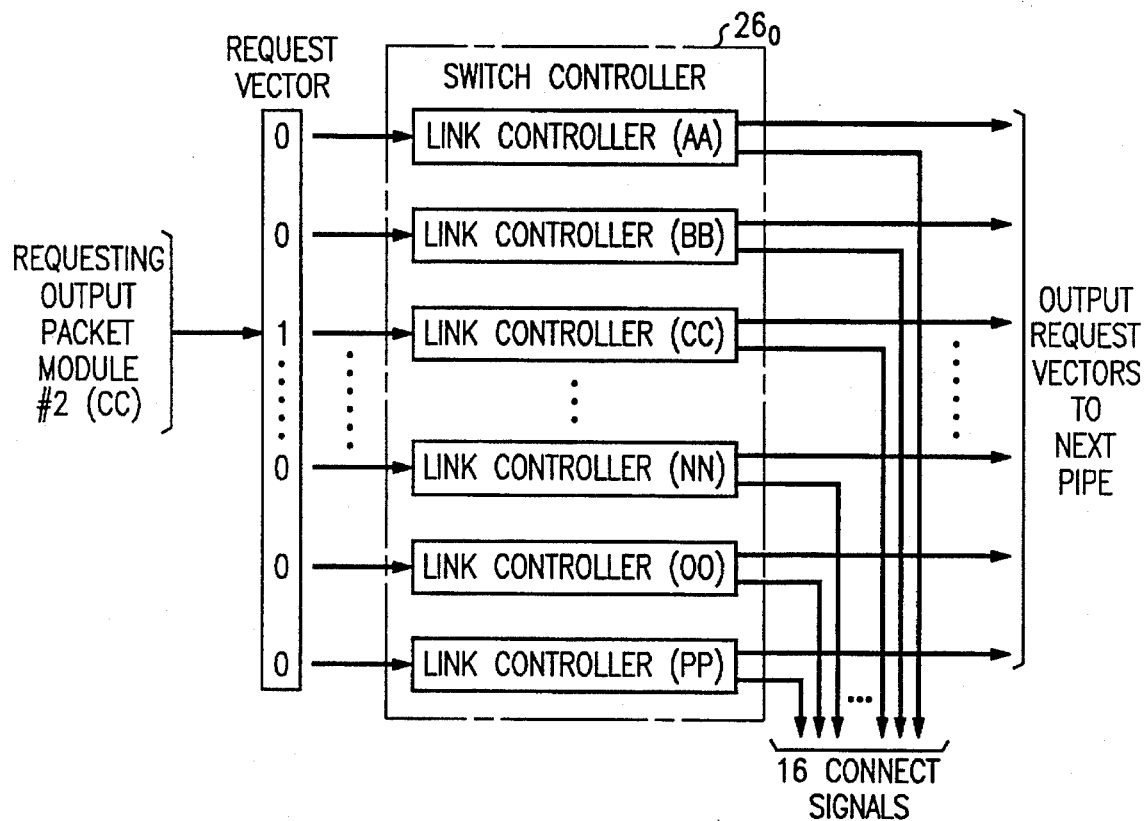
FIG. 10 is a simplified block diagram of a representative switch controller and its link controllers.
Figure 11:
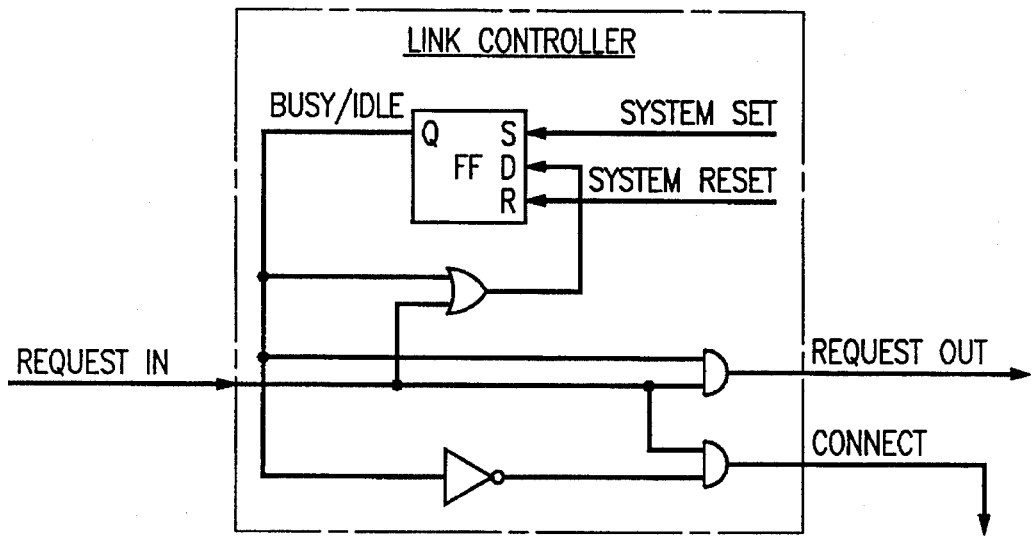
FIG. 11 is a detailed logic diagram of a link controller.
Figure 13A:
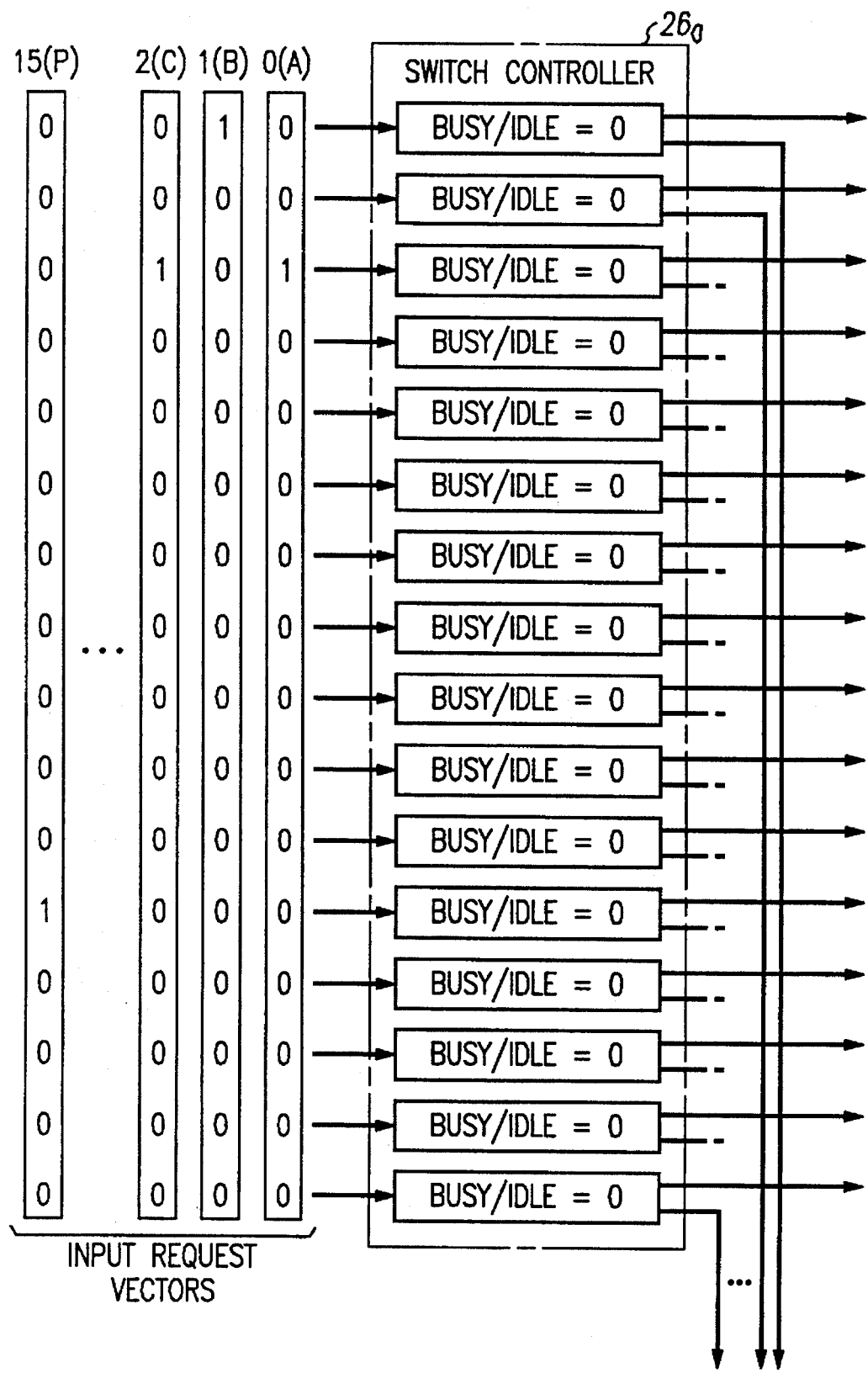
FIGS. 13A–13D when joined together show the operation of a switch controller in response to a sequence of requests.
Figure 13B:
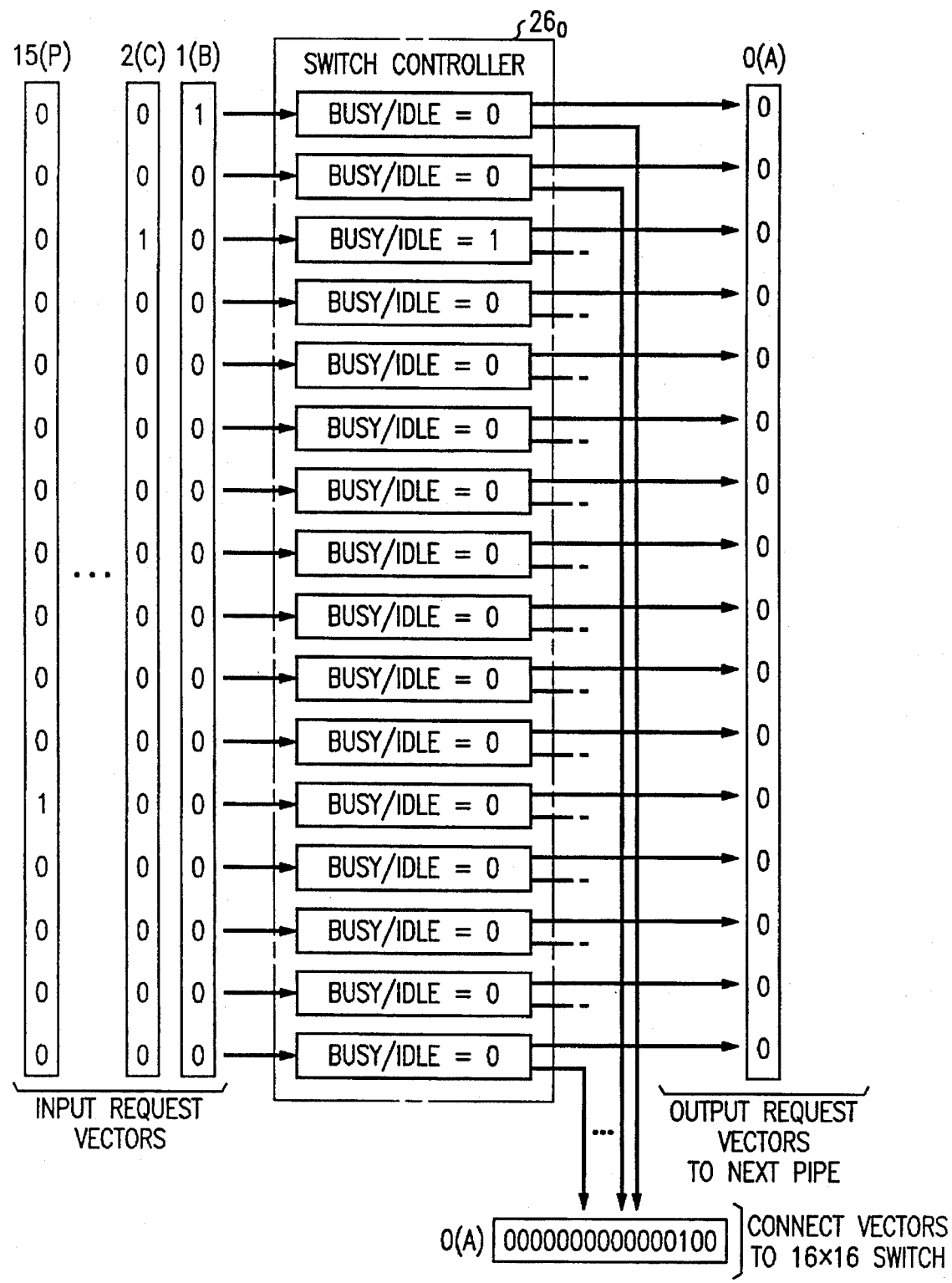
Figure 13C:
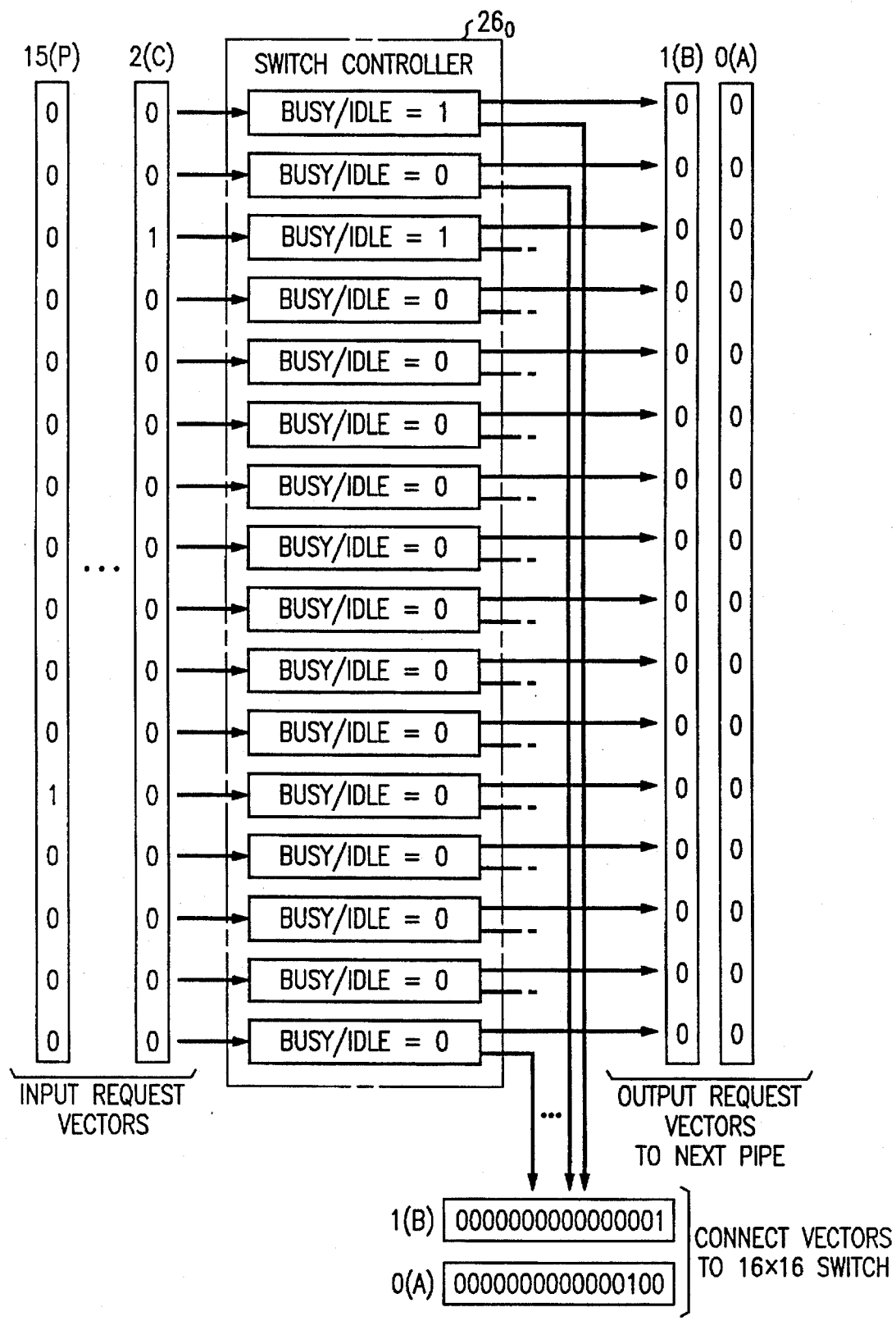
Figure 13D:
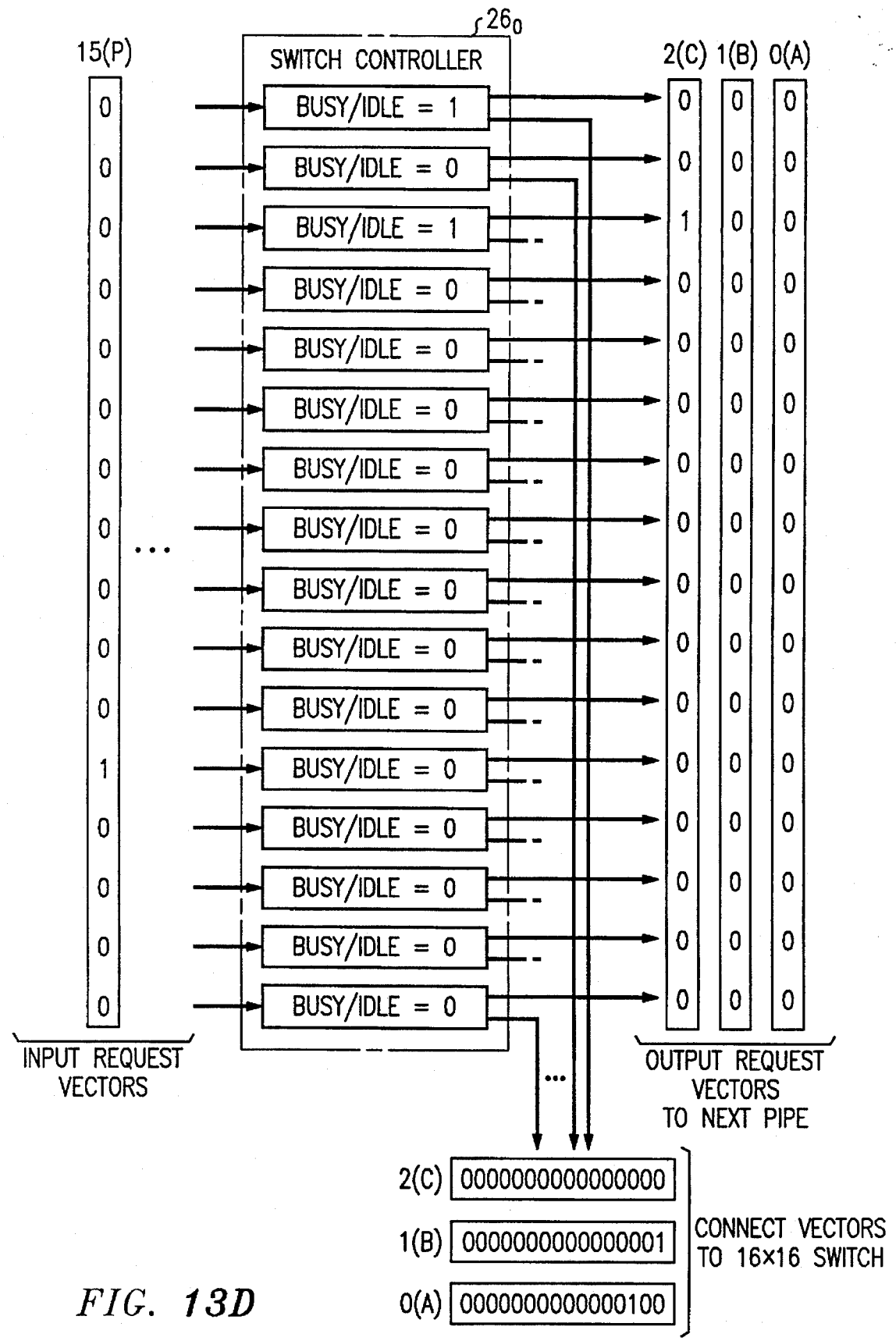

The first level of parallelism is obtained by providing each of the four pipes $18_0$–$18_3$ with a respective pipe hunt controller $24_0$–$24_3$. This level of parallelism allows pipe hunting to be carried out in all four pipe hunt controllers $24_0$–$24_3$ simultaneously. The second level of parallelism is obtained by providing switch controllers $26_0$–$26_{63}$, with sixteen switch controllers within each pipe hunt controller $24_0$–$24_3$. A unique switch controller $26_0$–$26_{63}$ is respectively associated with each of the 16×16 switches within each pipe of the switch fabric 14A. As a result, pipe hunting operations can be carried out in parallel within all sixteen of the switch controllers of each pipe hunt controller $24_0$–$24_3$. The third level of parallelism is obtained by permitting each of the switch controllers $26_0$–$26_{63}$ to perform parallel processing over all sixteen of the output links attached to its respective 16×16 crossbar switch. Effectively, each of the switch controllers $26_0$–$26_{63}$ reads sixteen busy-idle bits from its busy-idle memory in parallel, performs parallel pipe hunting operations based on those sixteen bits, and then writes the sixteen resulting busy-idle bits into its respective busy-idle memory in parallel with the other busy-idle memories. A representative switch controller $26_0$ of the sixty four switch controllers $26_0$–$26_{63}$ is shown in FIG. 10. The concurrent processing of sixteen busy-idle bits is accomplished by providing switch controller $26_0$ sixteen unique link controllers AA–PP, each of the link controllers AA–PP is assigned the task of processing busy-idle bits for one intermediate link between its portion of the switch fabric 14A and its respective output modules. In the embodiment shown in FIG. 10, the large busy-idle memory required to control switch 10A has been divided into many single bit memories, busy-idle flip-flops, with each single bit, busy-idle memory being logically and physically associated with its respective link controller AA–PP.

The general data flow for request vectors generated by the input interfaces $12_0$–$12_{255}$ is shown in FIG. 5. For example, input interface $12_0$ in FIG. 5 routes its request vector via connection $21_0$ to pipe hunting controller $24_0$ where it is poked into the pipe hunting ring (i.e. controller 20), and the rolling scheme requires the request vector to be looped through pipe hunt controller $24_1$, pipe hunt controller $24_2$, and pipe hunt controller $24_3$ as it circulates around the ring. In general, each of the input interfaces $12_0$–$12_{255}$ produces one request vector, and each request vector will contain a number of bits equal to the number of output modules within the system. The request vector from a single input interface in FIG. 5 is thus a sixteen-bit data word, where each bit of the request vector points to one of the sixteen output modules. If an ATM cell within a input interface is requesting a connection to an output port on the i-th output module, then bit i within the request vector will be set to a logic "1" and all other bits within the request vector will be set to a logic "0". When the controller 20 receives this particular request vector from the input interface, it can then identify that a path is required between the source input interface and the i-th output module.

The entire sixteen-bit request vector from a input interface is routed via a respective control connection $21_0$–$21_{255}$ to one of the four pipe hunt controllers $24_0$–$24_3$, and the controller 20 pokes the vector into one of the sixteen switch controllers associated with that particular pipe hunt controller. As shown in FIG. 10, the sixteen bits of the request vector are injected into a switch controller and are distributed across all sixteen of the link controllers within that particular switch controller. Each link controller is associated with a single link between the crossbar switches and the output modules, and it essentially processes one bit of the sixteen-bit request vector. This finite state machine circuitry that is associated with a single link controller consists of one flip-flop (the single-bit memory required to store the busy-idle bit associated with this link controller's link) and four logic gates. A state table description of the link controller operation is given in FIG. 12, where the state variable is defined by the busy-idle bit. The link controller hardware provides for one request vector input bit, designated request-in; one request vector output bit, designated request-out; and one connection vector output bit, designated connect. The request vector input bit is a logic "1" if the input desires a connection through the link associated with this link controller-otherwise, it is a logic "0". The request vector output bit is a logic "1" if the logic "1" input request vector bit was not satisfied by this particular link controller-otherwise, it is a logic "0". The connect vector output bit is a logic "1" if the logic "1" input request vector bit was satisfied by this particular link controller indicating the ATM cell will be routed to its desired output module through the link associated with this link controller-otherwise, it is a logic "0". The busy-idle flip-flop in FIG. 10 is reset to the logic "0" (idle) state at the beginning of each ATM cell slot, so the first request vector bit that enters the link controller with a logic "1" request is assigned the link (creating a logic "1" connect vector bit and a logic "0" output request vector bit) and sets the busy-idle flip-flop to the logic "1" (busy) state. Any subsequent request vector bits that enter the link controller during this particular ATM cell slot will be denied a connection through this link (forcing a logic "0" output on the connect vector bit and creating an output request vector bit that is identical to the input request vector bit). A time-lapsed view of several consecutive sixteen-bit request vectors passing through a single switch controller is shown in FIG. 12, along with the resulting states of the busy-idle bits stored within the switch controller. The resulting output request vectors and output connect vectors illustrate the general operation of each of the pipe hunt controllers $24_0$–$24_3$.

The use of rolling within the controller 20 requires a very precise temporal ordering of two fundamental events: poking and busy-idle flip-flip clearing. The timing diagram of FIG. 13 illustrates the synchronization and data flow that might be used for the logic within the controller 20. As indicated by the timing diagram, the flow of data around the ring of controller 20 is from pipe controller $24_0$ to pipe controller $24_1$ to pipe controller $24_2$ to pipe controller $24_3$ and back to pipe controller $24_0$. Request vectors generated by input interfaces with alias addresses A, B, C, and D are poked into pipe controller $24_0$. Request vectors generated by input interfaces with alias addresses E, F, G, and H are poked into pipe controller $24_1$. Request vectors generated by input interfaces with alias addresses I, J, K, and L are poked into pipe controller $24_2$. Request vectors generated by input interfaces with alias addresses M, N, O, and P are poked into pipe controller $24_3$. The poking times and busy-idle bit clearing times take place at different moments within each of the pipe hunt controllers $24_0$–$24_3$. From the point of view of any pipe controller, the request vector bits flow through the pipe controller in alphabetical order (A to P) if one ignores the busy-idle bit clearing times. This ordering guarantees that the aforementioned advantages of preferences will be realized within the controller 20, because the request vector generated from a input interface with alias address A will always be given precedence over the request vectors generated from input interfaces with alias addresses B, C, and D, etc.

The benefits derived from forced independence between the inputs on a particular 16×16 crossbar switch produce a slight increase in the complexity of the pipe hunter circuitry. Because of the independent connections between the input interfaces and the switch fabric 14A, which independence is assured by the use of Galois field theory, a request vector from a single input interface must be appropriately routed to several different switch controllers in each of the stages in the pipe hunting ring. The mixing nature of the Galois field theory generated connections requires each input interface $12_0$–$12_{255}$ to be connected to a different set of 16×16 crossbar switches within the switch fabric 14A, and as a consequence, it also requires request vectors generated on different input interfaces to be routed through entirely different sets of switch controllers within the controller 20. Since request vectors are time-multiplexed on links within the controller 20, all of the request vectors (within a particular ATM cell slot) that are expelled from a particular switch controller in one pipe hunter stage must (by definition) be routed to different switch controllers in the next pipe hunter stage. To provide this dynamic routing of the request vectors, each pipe hunt controller $24_0$, $24_1$, $24_2$ and $24_3$ is connected to a respective small switching network $30_0$, $30_1$, $30_2$ and $30_3$, shown in FIG. 5. Alternatively, simple multiplexers may be used instead of switching networks $30_0$, $30_1$, $30_2$ and $30_3$, thereby greatly decreasing costs for the controller 20. Fortunately, the required configurations of these small switching networks $30_0$, $30_1$, $30_2$ and $30_3$, (or multiplexers) are cyclic with a period equal to the ATM cell period, and the required configurations can be determined a priori and can therefore be "hard-coded" into the small switching networks (multiplexers) during the design of the circuitry of the controller 20.

As mentioned previously, ATM switch 10A shown in FIG. 5 might be scaled such that the number of input lines were 512, 1024 or even higher. For those size switches, assuming that the input lines are carrying 2.5 gigabits per second data rates, the aggregate throughput would be over 1.0 terabits per second. For switches of that size, a fourth level of parallelism may be needed to provide sufficient processing power for the controller 20 to hunt for all those paths through all those pipes. For ATM switches with 512 and 1024 input lines, the data rates on wires within their respective controllers are 204 megabits per second and 386 megabits per second, which is considerably higher that the 113 megabits per second rate of the 256 input line version of ATM switch 10A.

The basic idea behind the fourth level of parallelism is a modification of the previously described controller 20 design which requires that request vectors be routed through the pipe hunter stages in parallel. In particular, all of the request vectors that are poked into a particular pipe are routed through the pipe hunter stages together, and these request vectors are said to comprise a poke group. In the embodiment shown in FIG. 5, this approach to the design of controller 20 creates four poke groups of sixteen-bit request vectors, so each poke group contains sixty-four bits. The four poke groups can be labeled with a concatenation of the four alias labels on the request vectors. As a result, the four poke groups for the re-designed pipe hunter of FIG. 5 are called ABCD, EFGH, IJKL, and MNOP. It is important to note that whenever a single sixty-four bit ABCD poke group is being routed through one of the switch controllers in pipe controller a of FIG. 5, there is also a sixty-four bit ABCD poke group being routed through each of the other fifteen switch controllers in pipe controller $24_0$. As a result, there are a total of 1024 request vector bits associated with sixteen ABCD poke groups that are being routed through pipe $18_0$ at a single instant of time. The modified controller 20 processes the request vectors for all N input ports (by passing them through all four pipe hunt controllers $24_0$–$24_3$) every eight clock cycles, and since this task must be completed within a single 176 nano second ATM cell interval, the required clock rate within the controller 20 is 46 megabits per second regardless of the size (aggregate throughput) of the N×N ATM switch. As a result, since the controller 20 must perform eight processing steps (regardless of the network size), the process is said to be an O(1) path hunt algorithm. During the execution of this O(1) path hunt algorithm for the N=256 input ATM switch 10A of FIG. 5, the equivalent of 16,384 link controller path hunts and 16,384 link controller path hunt checks are performed every 176 nano second, so if each path hunt is considered to be an instruction execution and each path hunt check is considered to be an instruction execution, then the controller 20 can be viewed as a parallel processor capable of sustaining a 186 giga-instructions per second processing rate. The trade-off for maintaining a reasonable data rate in the controller 20 (regardless of size) is an increase in link controller logic complexity and an increase in signal connections passing between successive stages of the controller 20 as the size is increased. ATM switch designs with aggregate throughputs in excess of 1 Terabits per second will require between 4096 and 32,768 signals at 46 megabits per second to be routed between successive stages of the controller, i.e. between pipe hunt controllers $24_0$–$24_3$.

In addition to increasing the number of signals between pipe hunt controller stages, the use of parallelism within the controller 20 also requires a slight increase in the hardware requirements for each link controller, because each link controller must now support a parallel path hunt on four bits within the poke group. The extra hardware added to the controller 20 by the fourth level of parallelism should be offset by the resulting lower processing rate.

In addition to large throughputs and low data losses, an important and essential attribute for any switching product that will be used in the public switched network is fault tolerance, in order to provide a very high level of availability. A switching system that is fault-tolerant must display most, if not all, of the following attributes: 1) the ability to detect that a fault exists, 2) the ability to locate and identify the faulty component, 3) the ability to avoid the faulty component by detouring traffic through alternate paths within the network, 4) the ability to provide an acceptable level of performance (cell loss probability) even in the presence of a small percentage of faulty components, and 5) the ability to permit maintenance personnel to easily repair the faulty component (e.g., by swapping a board), and 6) the ability to provide an acceptable level of performance, i.e. cell loss probability, even when the faulty component is being repaired. These attributes typically require some level of redundancy within the switch paths to satisfy the requirements of attributes 3 and 4, and they also require redundancy at a next level higher within the network fabric and controller to satisfy the requirements of attributes 5 and 6.

Figure 15:
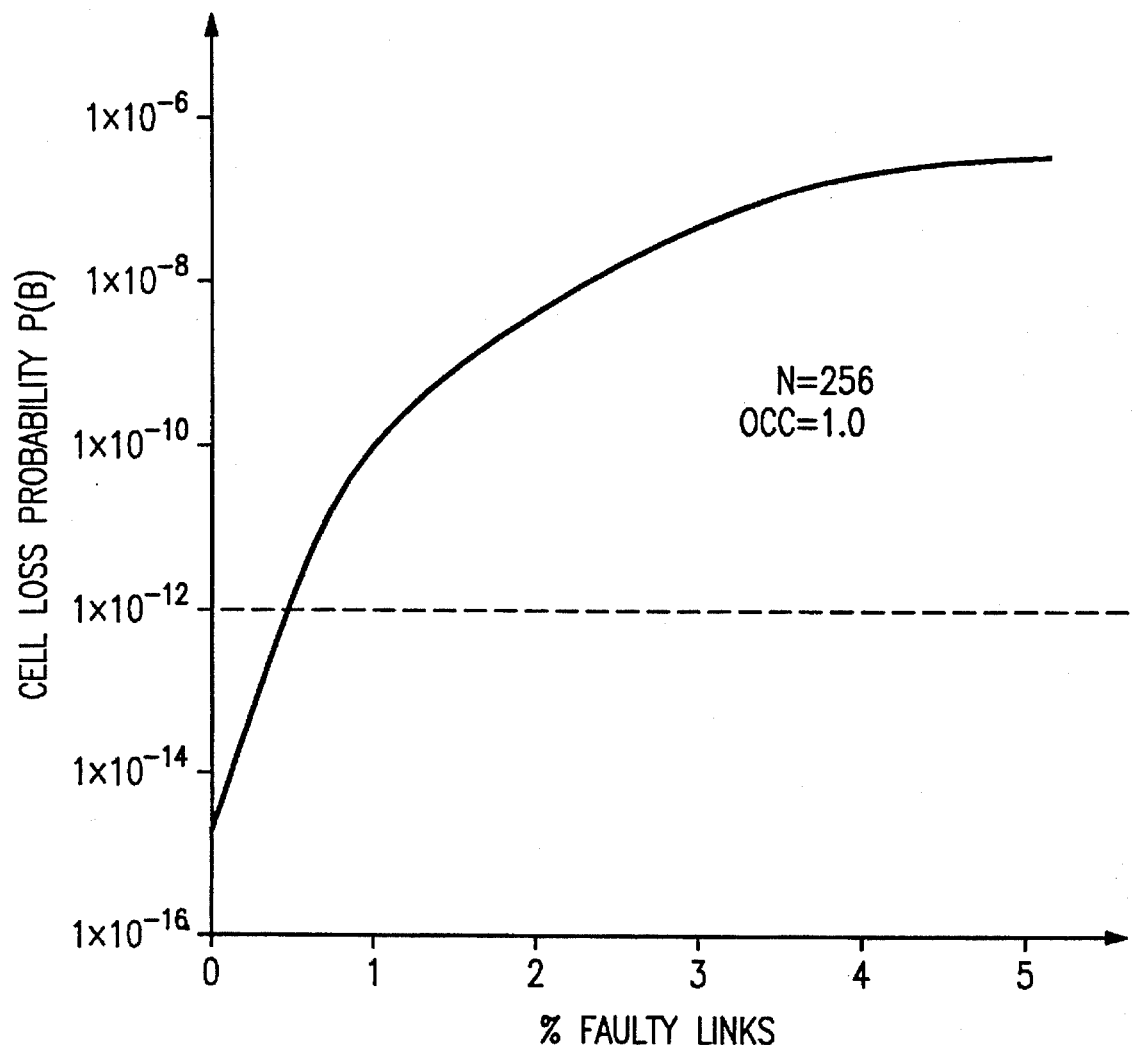
FIG. 15 shows a plot of packet loss probability versus the percentage of faulty links in the switch fabric.

A large benefit of using out-of-band control techniques within an ATM switch is derived from the fact that existing fault-tolerance techniques that have been applied for years in circuit switches can be re-used in the ATM switch 10A. As a result, all six of the above fault-tolerance requirements can be easily satisfied within the general architecture of ATM switch 10A. For example, FIG. 15 shows a plot of a simulation of the cell loss probability within the architecture of FIG. 5 when faulty links are added to the switch fabric 14A. It can be seen that while the cell loss probability increases as fault links are added, up to 0.5 percent of the links can be faulty before the cell loss probability exceeds the maximum acceptable level of $1 \times 10^{-12}$. This is a direct result of the fact that the architecture in FIG. 5 provides four paths between each input port and output port. Faulty paths can be rapidly identified by parity or CRC checks at the output modules $16_0$–$16_{15}$. If an error is detected, the controller 20 already knows what path the corrupted ATM cell had been routed through, so it can check the path by sending an "interrogation ATM cell" through the switch fabric 14A. If the interrogation ATM cell is also corrupted, then the path should be taken out of service by writing the busy-idle bit for the path to the maintenance busy state, which is not cleared even when the global clear is sent at the end of each ATM cell period.

Although the present ATM standard does not define or require a service that supports variable length cells or packets, the evolutionary tendencies of the telecommunication industry are towards ATM cells with lengths that differ from the initially defined 53-byte standard. This change may evolve as a result of the satisfaction (or dissatisfaction) that different users may find as they begin to experiment with different applications being transported over the ATM packet lines and networks. For example, the very fact that the current ATM cell length represents a compromise between the voice and data communities indicates that there may be some customers in the future who are not entirely satisfied with the offered cell size. Should such customers become organized, it is possible that another cell length (other than 53 bytes) may be requested. For example, the CATV industry is already considering cell sizes greater than 53 bytes for transporting MPEG-2 digital video streams. Although larger packets might be routed inside multiple 53 byte ATM cells, the resulting bandwidth inefficiencies may ultimately lead to the desire for a new cell length standard. Thus, it is desirable to have an ATM switch architecture that can adapt to changes in cell or packet length.

Figure 16:
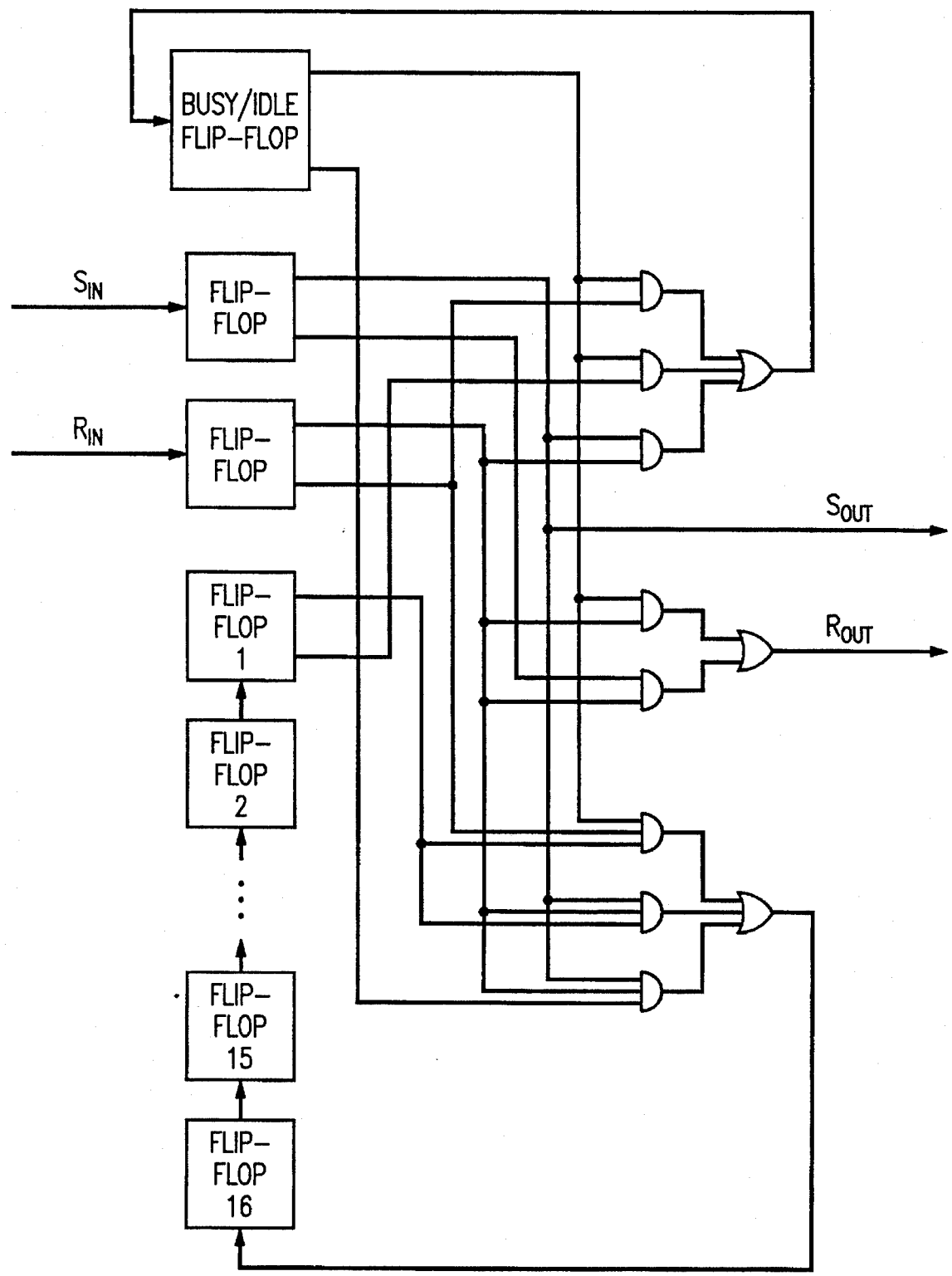
FIG. 16 is a detailed logic diagram of a link controller for indefinite length packets.

With only a few minor modifications to the input interfaces $12_0$–$12_{255}$ and the controller 20, operation of ATM switch 10A with cells of arbitrary cell lengths is provided. This is accomplished by allowing arbitrary length that are an integer multiple of the basic cell period, which can be 53 bytes or some other desired length. The ATM switch 10A may be modified so readily to support arbitrary cell lengths primarily because ATM switch 10A is essentially a circuit switch, i.e. an arbitrarily long message switch, with the update capability of a very fast out-of-band path hunt processor. For fixed cell length operation described previously, the controller 20 of the switch 10A performs path hunts for cells that arrive on potentially all of the N input ports, and it must then set up the N paths for all of these routed cells. At the end of the 176 nano second cell interval, all of these N paths are globally torn down, making all of the network connections idle for the next cell interval when the entire process is repeated. If variable length cells are permitted, then it should be apparent that the global tear-down of all N paths at the end of a cell interval is no longer permitted. In fact, all of the paths from one cell interval must be left established in the next cell interval, and individual path tear-downs must be implemented whenever the termination of a cell is identified by its respective input interface $12_0$–$12_{255}$. Thus, to modify ATM switch 10A to handle variable length cells requires that each input interface $12_0$–$12_{255}$ be modified to be capable of identifying the start and end of each cell, either with fixed and unique start and end patterns, a unique start pattern coupled with a cell length identifier contained within the cell, or some other type of indication. Each modified input interface must then be capable of sending two different types of request vectors to a modified controller 20': one to request a path set-up and one to request a path tear-down. This can be accomplished by adding a single bit to the 16-bit request vector shown in FIGS. 13A–13D, where the additional bit is used to indicate whether the request is a set-up request or a tear-down request. Upon reception of the request vector, the controller 20' routes the request vector through all four of the pipe controllers $24_0$–$24_3$ (as before), but the link controllers must now be capable of both setting and resetting the busy-idle flip-flops in response to the different types of request vectors. In addition, the link controller associated with a particular output link must also maintain a memory indicating which input presently has a path established to its output link, because only that input is permitted to tear down the path to the output link. The hardware required for all of these functions within a link controller is illustrated in FIG. 16. It should be noted that the inclusion of variable length cell routing within the distribution network requires that the processing rate within the controller 20' be increased by a factor of two, because it is possible that every input may require a single path set-up and a single path tear-down every ATM cell interval. It should also be noted that the inclusion of variable length cell routing does not preclude the implementation of any of the other features of the switch 10A that have been mentioned previously.

The use of variable length cells within the switch fabric 14A also requires that the output modules $16_0$–$16_{15}$ be modified to route cells with different cell lengths. The lengths of the buffers would have to be increased to accommodate at least four times the longest cell or packet that can be communicated.

Figure 17:
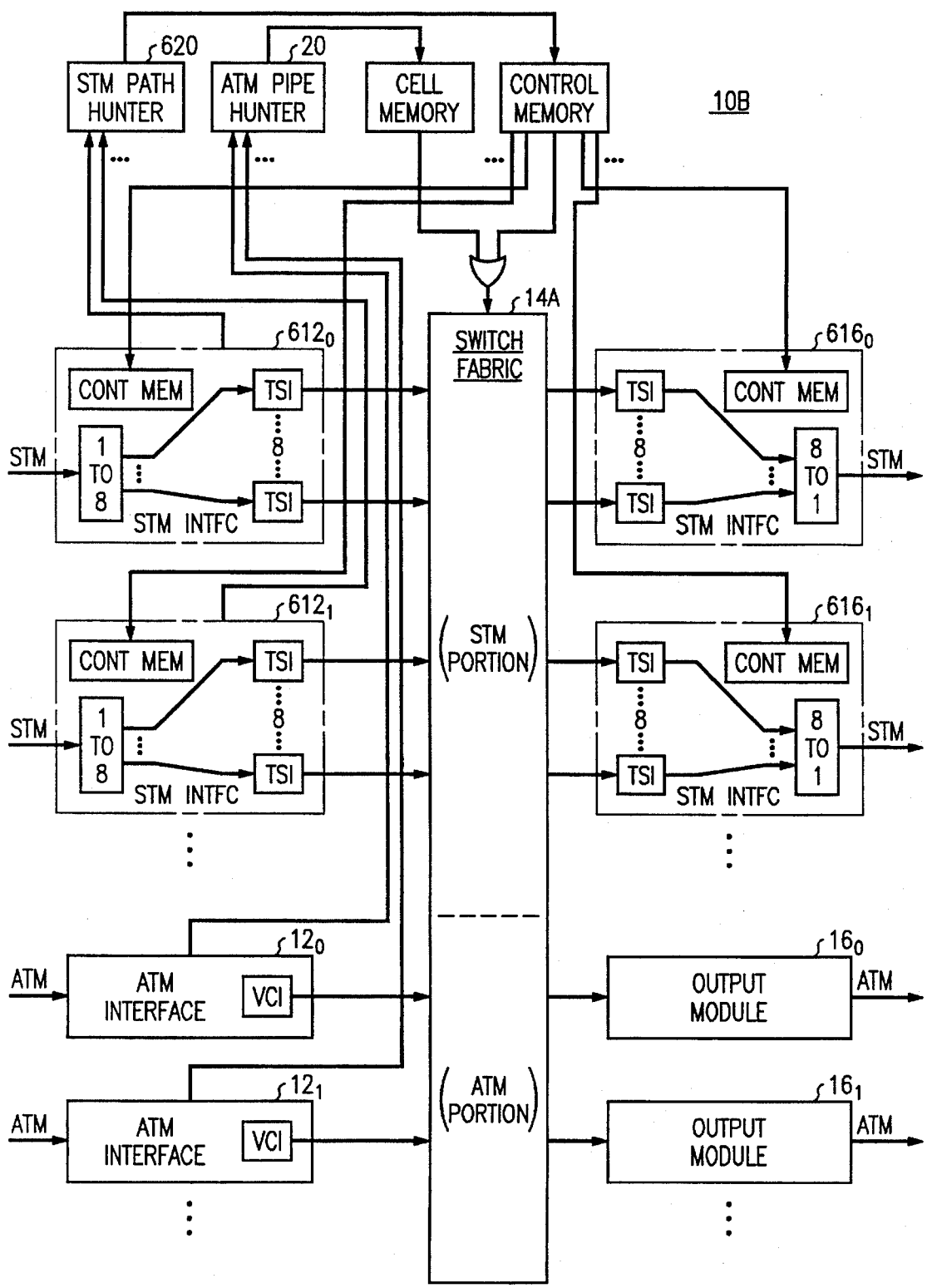
FIG. 17 is a block diagram of a switch that routes both circuit switched communications and packet switched communications through the same switch fabric.

The rapid acceptance of ATM within the LAN and WAN communities indicates that ATM may already be developing a strong foot-hold in the private-switched network environment. As a result, it may be only a matter of time before there is a strong demand for ATM services in the public-switched network environment. However, when or if that strong demand occurs is uncertain. There is some question within the telecommunications industry of the ability of ATM to efficiently provide services that are inherently constant-bit-rate services (voice and video), and also the ability of ATM networks to effectively route traffic in a network where the traffic is highly correlated rather than random. Because of this uncertainty, ATM service providers and ATM switch vendors must proceed cautiously. A switch based on the switch fabric 14A is a sensible system in such uncertain times because the architecture is flexible enough to provide both packet switching (ATM) and circuit switching (STM) communications at the same time. Such a switch 10B is shown in FIG. 17. Since STM switching is a form of circuit switching, and since the switch fabric 14A is essentially a circuit switch with very fast path hunting capabilities, the switch fabric 14A is well suited for the routing of STM traffic. A slightly different controller 620 is required for STM traffic, and the input interfaces 612 and output modules 616 provide time-slot interchanger functions required by circuit switching equipment, but the single stage switch fabric 14A can remain unaltered in a combination STM and ATM switch, or in a wholly STM switch. Simulations have been written to analyze the operation of the switch fabric 14A in a wholly STM environment, where an N=256 ATM switch is modified to implement an N=128 STM switch. The resulting blocking probability of this N=128 STM switch has been calculated from this simulation to be less than $1 \times 10^{-9}$. This is a very acceptable value in a circuit switched environment where packet loss is not an issue. Thus, switch 10B can vary the percentage of STM traffic it carries up to 100 per cent. This flexibility greatly reduces or eliminates the possible financial consequences of the uncertainty in the demands of customers for future ATM and STM services.

The switch fabric 14A is essentially technology-independent. An embodiment using free-space digital optics as the interconnection technology within the switch fabric is contemplated. The 16×16 crossbar switches within the switch fabric 14A will be implemented with FET-SEED device arrays. Such an approach may provide many benefits within the switch fabric 14A, because the resulting design based on optical interconnections may have lower levels of signal crosstalk, lower chip counts due to increased device integration, lower signal skew, and lower overall power dissipation, which results in simpler thermal management techniques within the switch fabric 14A.

While the invention has been particularly illustrated and described with reference to preferred embodiments thereof, it will be understood by those skilled in the art that various changes in form, details, and applications may be made therein. It is accordingly intended that the appended claims shall cover all such changes in form, details and applications which do not depart from the true spirit and scope of the invention.

What is claimed is:

1. A packet switch for switching circuit switched communications from a plurality of circuit switched input lines to a plurality of circuit switched output lines and packet switched communications from a plurality of packet switched input lines to a plurality of packet switched output lines, comprising:

a plurality of circuit switched input interfaces, each having an input port connected to a respective circuit switched input line of said plurality of circuit switched input lines, and each of said circuit switched input interfaces having an output port;

a plurality of packet switched input interfaces, each having an input port connected to a respective packet switched input line of said plurality of packet switched input lines, and each of said packet switched input interfaces having an output port;

a single stage switch fabric having a plurality of input ports with a first portion of said input ports connected to respective output ports of said circuit switched input interfaces and a second portion of said input ports connected to respective output ports of said packet switched input interfaces;

a plurality of circuit switched output modules, said circuit switched output modules together having a plurality of inputs, each of said circuit switched output module inputs connected to respective output port of said first portion of said single stage switching fabric, and together having a plurality of outputs, each of said circuit switched output module outputs connected to a respective circuit switched output line of said plurality of circuit switched output lines;

a plurality of packet switched output modules, said packet switched output modules together having a plurality of inputs, each of said packet switched output module inputs connected to respective output port of said second portion of said single stage switching fabric, and together having a plurality of outputs, each of said packet switched output module outputs connected to a respective packet switched output line of said plurality of packet switched output lines;

means for hunting a path through said switch fabric to a desired circuit switched output line for communication on each circuit switched input line; and means for hunting a path through said switch fabric to a desired packet switched output line for a packet on each packet switched input line.

2. The switch as set forth in claim 1, wherein:

said circuit switched communication path hunting means includes a first out of band, controller; and said packet switched communication path hunting means includes a second out of band, controller.

3. The switch as set forth in claim 2, wherein said switch fabric is partitioned into multiple pipes.

4. The switch as set forth in claim 3, wherein said out-of-band controllers roll requests which have been denied a path through a first pipe to a second pipe.

5. The switch as set forth in claim 3, wherein said out-of-band controllers roll requests which have been denied a path through a first pipe and a second pipe to a third pipe.

6. The switch as set forth in claim 3, wherein said out-of-band controllers roll requests which have been denied a path through a first pipe, a second pipe and a third pipe to a fourth pipe.

7. The switch as set forth in claim 3, wherein said second out-of-band controller assigns an order of preference to communication packets.

8. The switch as set forth in claim 1, wherein a size of said first portion of said switch fabric is in a range of zero to one hundred per cent.

9. The switch as set forth in claim 8, wherein a length of each communication packet may vary from one packet to another.

10. The switch as set forth in claim 1, wherein a length of each communication packet may vary from one packet to another.

11. A packet switch for switching a telecommunication packet from a plurality of input lines to a plurality of output lines, comprising:

a plurality of input interfaces, each having an input port connected to a respective input line of said plurality of input lines, and each of said input interfaces having an output port;

a network for switching a plurality of I input ports to a plurality of P output ports;

each of said plurality of input interface output ports is fanned out to a respective group of F of said I input ports of said network;

said network having a plurality of C pipes, where C is an integer of a value equal to P/I;

a plurality of output modules, said output modules together having a plurality of inputs, each of said output module inputs connected to respective output port of said plurality of P output ports, and together having a plurality of outputs, each of said output module outputs connected to a respective output line of said plurality of output lines;

each pipe of said C pipes having a path from each of the plurality of inputs lines that is connectable to a respective output line of the plurality of output lines;

a spare pipe for on-line replacement of any one of said C pipes which is faulty; and means for hunting a path through said packet switch for a telecommunication packet.

* * * * *